US012277726B2

(12) United States Patent
Forutanpour et al.

(10) Patent No.: US 12,277,726 B2
(45) Date of Patent: Apr. 15, 2025

(54) COLLABORATIVE TRACKING

(71) Applicant: QUALCOMM Incorporated, San Diego, CA (US)

(72) Inventors: Bijan Forutanpour, San Diego, CA (US); Sebastien Mounier, San Diego, CA (US); Jonathan Kies, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/502,983

(22) Filed: Nov. 6, 2023

(65) Prior Publication Data

US 2024/0078700 A1 Mar. 7, 2024

Related U.S. Application Data

(63) Continuation of application No. 17/351,856, filed on Jun. 18, 2021, now Pat. No. 11,847,793.

(51) Int. Cl.
*G06T 7/73* (2017.01)
*G06T 7/00* (2017.01)

(52) U.S. Cl.
CPC ............... *G06T 7/73* (2017.01); *G06T 7/0008* (2013.01); *G06T 2207/10012* (2013.01); *G06T 2207/20004* (2013.01); *G06T 2207/30196* (2013.01); *G06T 2207/30232* (2013.01); *G06T 2207/30242* (2013.01)

(58) Field of Classification Search
None
See application file for complete search history.

(56) References Cited

U.S. PATENT DOCUMENTS

| 11,651,598 | B2* | 5/2023 | Bande | G01C 21/1656 |
| | | | | 382/104 |
| 2012/0194551 | A1* | 8/2012 | Osterhout | G06F 3/005 |
| | | | | 345/633 |
| 2013/0321670 | A1* | 12/2013 | Zander | H04N 23/69 |
| | | | | 348/240.99 |
| 2014/0301202 | A1* | 10/2014 | Bouazizi | H04L 67/59 |
| | | | | 370/235 |

(Continued)

OTHER PUBLICATIONS

International Search Report and Written Opinion—PCT/US2022/032732—ISA/EPO—Sep. 19, 2022.

*Primary Examiner* — Delomia L Gilliard
(74) *Attorney, Agent, or Firm* — QUALCOMM Incorporated

(57) ABSTRACT

An imaging system can receive an image of a portion of an environment. The environment can include an object, such as a hand or a display. The imaging device can identify a data stream from an external device, for instance by detecting the data stream in the image or by receiving the data stream wirelessly from the external device. The imaging device can detect a condition based on the image and/or the data stream, for instance by detecting that the object is missing from the image, by detecting that a low resource at the imaging device, and/or by detecting visual media content displayed by a display in the image. Upon detecting the condition, imaging device automatically determines a location of the object (or a portion thereof) using the data stream and/or the image. The imaging device generates and/or outputs content that is based on the location of the object.

30 Claims, 12 Drawing Sheets

(56) References Cited

U.S. PATENT DOCUMENTS

| | | | |
|---|---|---|---|
| 2014/0317659 A1* | 10/2014 | Yasutake | H04N 21/25841 |
| | | | 725/43 |
| 2017/0193301 A1* | 7/2017 | Wexler | H04N 7/185 |
| 2017/0195505 A1* | 7/2017 | Wexler | G06F 16/583 |
| 2017/0223076 A1* | 8/2017 | Wexler | G06F 21/6245 |
| 2017/0228029 A1* | 8/2017 | Wexler | H04N 7/15 |
| 2020/0053253 A1* | 2/2020 | Kavallierou | H04N 21/4622 |
| 2022/0028157 A1* | 1/2022 | Cabral | H04N 7/147 |
| 2022/0084279 A1* | 3/2022 | Lindmeier | G06F 3/012 |
| 2022/0405959 A1 | 12/2022 | Forutanpour et al. | |
| 2023/0048398 A1* | 2/2023 | Mounier | G06F 3/0346 |

* cited by examiner

COLLABORATIVE TRACKING

CROSS-REFERENCE TO RELATED APPLICATIONS

This application is a continuation of U.S. Non-Provisional application Ser. No. 17/351,856, filed, Jun. 18, 2021, which is hereby incorporated by reference, in its entirety and for all purposes.

FIELD

The present disclosure generally relates to image processing. For example, aspects of the disclosure relate to systems and techniques for combining data from multiple devices to perform object tracking within an environment and provide output based on the tracking.

BACKGROUND

An extended reality (XR) device is a device that displays an environment to a user, for example through a head-mounted display (HMD), glasses, a mobile handset, or other device. The environment is at least partially different from the real-world environment in which the user and the device are located, and may for instance include virtual content. The user can generally change their view of the environment interactively, for example by tilting or moving the XR device. Virtual reality (VR), augmented reality (AR), and mixed reality (MR) are examples of XR.

XR devices can include one or more image sensors, for instance within one or more cameras. For example, cameras in XR devices can be used for capturing image data of a real-world environment in a direction in which a user is looking and from a perspective of the user's location. Image sensors in XR devices can also be used to capture image data for tracking purposes (e.g., hand tracking, head tracking, body tracking, etc.).

An XR device can display a representation of the user's hands in the environment that the XR device displays to the user, so that the user feels as if they are in that environment. Hand tracking can allow the XR device to accurately represent the user's hands in the environment, and can allow user to interact with real or virtual objects within the environment. However, hand tracking generally requires the user to keep their hands within the field of view (FOV) of the XR device's image sensors. XR devices can suffer from errors if the user's hands exit the FOV or are occluded. Hand tracking is generally a computationally expensive process that can draw battery power rapidly.

BRIEF SUMMARY

In some examples, systems and techniques are described for feature tracking based on data from multiple devices. An imaging device, such as an XR device, can make use of one or more data streams from one or more external devices. For instance, an image may be received from an image sensor of the imaging device. The image can be an image of a portion of an environment. The environment includes an object, such as a user's hand or a display screen, though the object may or may not be present in the portion of the environment depicted in the image. The imaging device can identify a data stream from an external device, for instance based on the image (e.g., by identifying the data stream depicted in the image, such as visual media content displayed on an external display device depicted in the image), based on one or more transmissions of the data stream to the imaging device from the external device (e.g., over a wireless network or wired network), based on user input, and/or based on other factors. The imaging device can detect a condition, such as based on the image, the data stream, an operational status of the imaging device, any combination thereof, and/or based on other factors. In some examples, the condition can be based on the imaging device losing track of the object, the imaging device being low on computational resources (e.g., low on power and/or based on other operational status of the apparatus), the imaging device detecting visual media content (or a representation thereof) within the image, based on a user input or setting that requests using the external device rather than the imaging device (e.g., XR device) when available for a particular function (e.g., displaying content, tracking an object such as a hand, head, or body of a user), based on a user input or setting indicating a preference that a device (e.g., the external device) be used for a particular function when plugged into the imaging device, that a privacy and/or security is a factor (which could also be based on a user input or setting), based on a user input (e.g., a user input requesting that resources be offloaded to the external device, such as a user input requesting to turn off the imaging device, a user input requesting to turn an external device such as a light on or off through a home automation application running on the imaging device, etc.), based on capabilities of an image sensor of the imaging device (e.g., when an infrared (IR) sensor on one device is useful where ambient lighting is inadequate, when an object being tracked is moving fast and the image sensor with a higher frame rate is more appropriate, etc.), or any combination thereof.

In some cases, the imaging device can merge the data from the data stream with the image captured by the image sensor, resulting in a merged dataset. Based on detecting the condition, the imaging device can determine a location of at least a part of the object in the environment based on the data stream, the image, and/or the merged dataset. The imaging device can generate an output (e.g., content, a command to control the imaging device, a command to control the external device, etc.). The imaging device can output content that is based on the location of at least the part of the object in the environment. In one example, if the object is the user's hand, the content generated and/or output by the imaging device can position a virtual object held by the user's hand accurately based on the location of the user's hand (determined based on the data stream, the image, and/or the merged dataset), even if the user's hand is not depicted in the image. If the object is a display screen and/or visual content displayed on the display screen, the content generated and/or output by the imaging device can position virtual content adjacent to the position of the display screen.

In one example, an apparatus for image processing is provided. The apparatus includes a memory and one or more processors (e.g., implemented in circuitry) coupled to the memory. The one or more processors are configured to and can: receive an image of a portion of an environment captured by an image sensor, wherein the environment includes an object; identify a data stream from an external device; detect a condition based on at least one of the image, the data stream, and an operational status of the apparatus; in response to detecting the condition, determine a location of the object in the environment based on at least one of the image and the data stream; and generate an output based on the location of the object in the environment.

In another example, a method of image processing is provided. The method includes: receiving, by a device, an image of a portion of an environment captured by an image sensor, wherein the environment includes an object; identifying a data stream from an external device; detecting a condition based on at least one of the image, the data stream, and an operational status of the device; in response to detecting the condition, determining a location of the object in the environment based on at least one of the image and the data stream; and generating an output based on the location of the object in the environment.

In another example, a non-transitory computer-readable medium of a device is provided that has stored thereon instructions that, when executed by one or more processors, cause the one or more processors to: receive an image of a portion of an environment captured by an image sensor, wherein the environment includes an object; identify a data stream from an external device; detect a condition based on at least one of the image, the data stream, and an operational status of the device; in response to detecting the condition, determine a location of the object in the environment based on at least one of the image and the data stream; and generate an output based on the location of the object in the environment.

In another example, an apparatus for image processing is provided. The apparatus includes: means for receiving an image of a portion of an environment captured by an image sensor, wherein the environment includes an object; means identifying a data stream from an external device; means detecting a condition based on at least one of the image, the data stream, and an operational status of the apparatus; means for determining, in response to detecting the condition, a location of the object in the environment based on at least one of the image and the data stream; and means for generating an output based on the location of the object in the environment In some aspects, to detect the condition based on the image, the methods, apparatuses, and computer-readable medium described above further include determining that the object is missing from a portion of the environment in the image.

In some aspects, to determine that the object is missing from the portion of the environment in the image, the methods, apparatuses, and computer-readable medium described above include determining that at least a part of the object is occluded in the image.

In some aspects, the external device includes a second image sensor. In some cases, the data stream includes a second image of a second portion of the environment. In such cases, determining the location of the object in the environment can be based at least in part on a depiction of the object in the second image. In some aspects, the portion of the environment and the second portion of the environment overlap.

In some aspects, to detect the condition based on the operational status of the apparatus, the methods, apparatuses, and computer-readable medium described above include determining that an availability of a resource is below a threshold. In some aspects, to determine that the availability of the resource is below the threshold, the methods, apparatuses, and computer-readable medium described above include determining that a battery level of a battery is below a battery level threshold.

In some aspects, to determine that the availability of the resource is below the threshold, the methods, apparatuses, and computer-readable medium described above include determining that an available bandwidth is below a bandwidth threshold.

In some aspects, to detect the condition based on the operational status of the apparatus, the methods, apparatuses, and computer-readable medium described above include receiving user input corresponding to offloading processing to the external device.

In some aspects, to generate the output, the methods, apparatuses, and computer-readable medium described above include generating content. In some cases, the methods, apparatuses, and computer-readable medium described above include, the one or more processors are configured to output the content based on the location of the object in the environment.

In some aspects, to output the content, the methods, apparatuses, and computer-readable medium described above include sending the content to a display (e.g., of the apparatus or the device) to be displayed.

In some aspects, the methods, apparatuses, and computer-readable medium described above include: detecting an additional condition based on at least one of an additional image captured by the image sensor, the data stream, and the operational status of the apparatus; and in response to detecting the additional condition, performing a function previously performed by the external device.

In some aspects, to generate the output, the methods, apparatuses, and computer-readable medium described above include controlling the apparatus based on a user input.

In some aspects, to detect the condition based on the image, the methods, apparatuses, and computer-readable medium described above include determining one or more lighting conditions in the image.

In some aspects, to determine the one or more lighting conditions in the image, the methods, apparatuses, and computer-readable medium described above include determining that one or more light values of the image are below a lighting threshold.

In some aspects, to determine the location of the object in the environment, the methods, apparatuses, and computer-readable medium described above include: sending a request for the external device to identify the location of the object in the environment; and receiving a response from the external device identifying the location of the object in the environment.

In some aspects, the object is a display of an external display device.

In some aspects, to detect the condition based on the image, the methods, apparatuses, and computer-readable medium described above include identifying, in the image, visual media content displayed on the display of the external display device.

In some aspects, to generate the output, the methods, apparatuses, and computer-readable medium described above include generating content. In some cases, the content virtually extends the display of the external display device.

In some aspects, to generate the output, the methods, apparatuses, and computer-readable medium described above include generate content at least in part by overlaying virtual content over a region of the image. In some cases, the region of the image is based on the location of the object in the environment.

In some aspects, the object is a display of an external display device. In some cases, the region of the image is adjacent to a depiction of the display of the external display device in the image.

In some aspects, the object is a hand of a user of the apparatus. In some cases, the hand is at least partially adjacent to the region of the image.

In some aspects, the methods, apparatuses, and computer-readable medium described above include, in response to detecting the condition, generate a merged dataset at least by combining data from the data stream with the image captured by the image sensor. In some cases, determining the location of the object is based at least in part on the merged dataset.

In some aspects, to generate the output, the methods, apparatuses, and computer-readable medium described above include generating content. In some cases, the output, the methods, apparatuses, and computer-readable medium described above include transmitting or sending the content to an audio output device (e.g., of the apparatus or the device) to be played.

In some aspects, each of the apparatuses or devices described above is, can be part of, or can include an extended reality (XR) device (e.g., a virtual reality (VR) device, an augmented reality (AR) device, or a mixed reality (MR) device), a smart device or assistant, a vehicle, a mobile device (e.g., a mobile telephone or so-called "smart phone" or other mobile device), a wearable device, a personal computer, a laptop computer, a tablet computer, a server computer, or other device. In some aspects, the apparatus or device includes an image sensor (e.g., a camera) or multiple image sensors (e.g., multiple cameras) for capturing one or more images. In some aspects, the apparatus or device includes one or more displays for displaying one or more images, notifications, and/or other displayable data. In some aspects, the apparatus or device includes one or more speakers, one or more light-emitting devices, and/or one or more microphones. In some aspects, the apparatuses or devices described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures.

DETAILED DESCRIPTION

Figure 1:
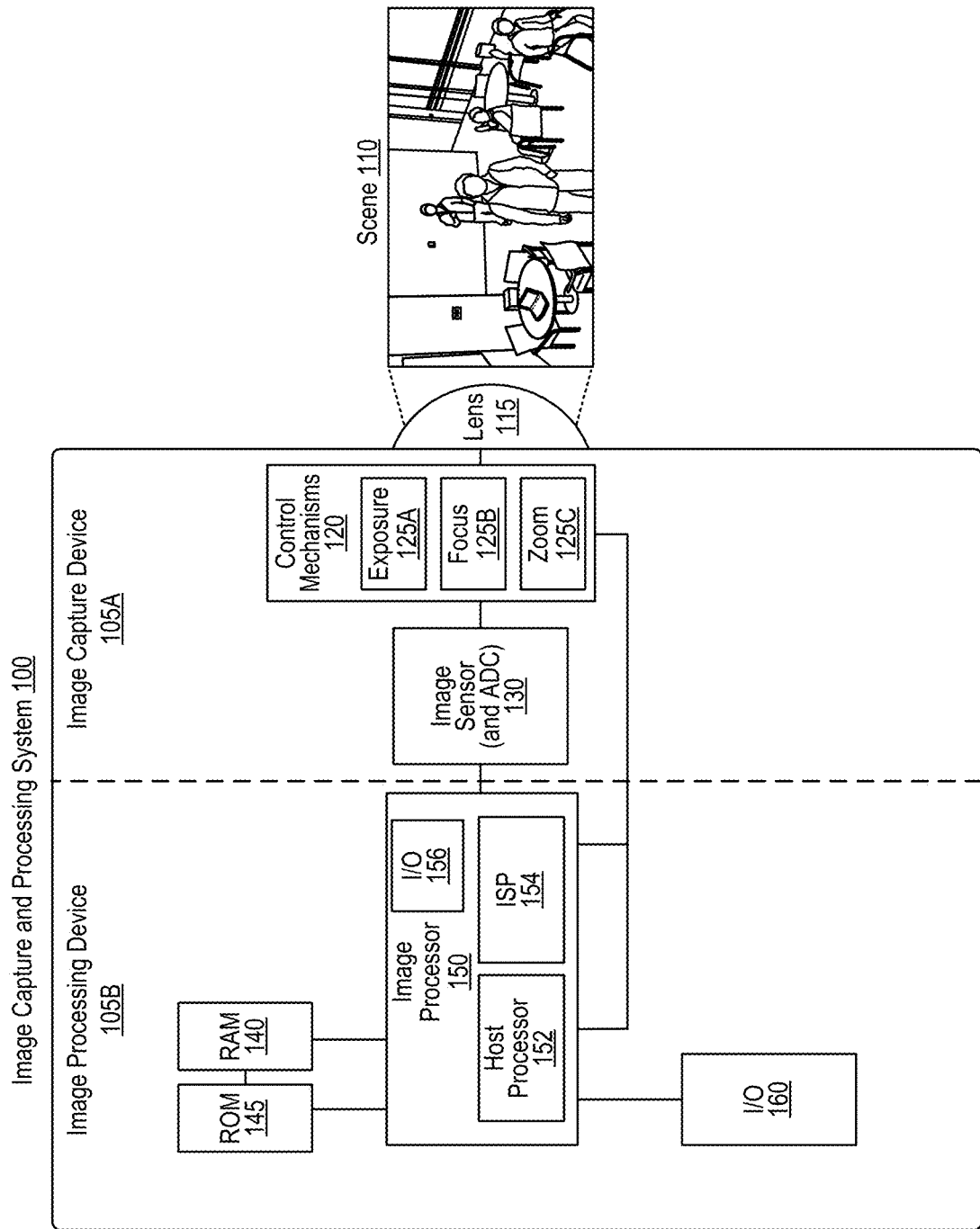
FIG. 1 is a block diagram illustrating an example architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

An extended reality (XR) device is a device that displays an environment to a user, for example through a head-mounted display (HMD), glasses, a mobile handset, or other device. The displayed environment is at least partially different from the real-world environment in which the user and the device are located, and may for instance include virtual content. In some cases, the environment that the XR device displays to the user can be at least partially virtual. The user can generally change their view of the environment that the XR device displays to the user interactively, for example by tilting the XR device and/or or moving the XR device translationally or laterally. Tilting the XR device can include tilts or rotations along the pitch axis, the yaw axis, the roll axis, or a combination thereof. Translational/lateral movements of the XR device can include movements along paths charted within a 3-dimensional volume having 3 perpendicular axes, such as an X, a Y axis, and a Z axis. XR devices that only track rotational movement of the XR device can be referred to XR devices with three degrees of freedom (3DoF). XR devices that track both rotational and translational movement of the XR device can be referred to as XR devices having six degrees of freedom (6DoF) tracking capabilities.

An XR device can include sensors, such as image sensors, accelerometers, gyroscopes, inertial measurement units (IMUs), or combinations thereof. The XR device can use data captured by these sensors to detect movement of the XR device within the real-world environment, for instance so that the XR device can update the user's view of the environment interactively based on rotational and/or translational movement of the XR device. Some XR devices can also use data captured by these sensors to detect and/or track features of one or more objects, such as a user's hands. Even XR devices that display otherwise fully-virtual VR environments to users can still display representations of the user's own hands in the environment. Displaying representations of the user's hands in the environment can increase immersion in the environment for users of the XR device, helping the users feel that they are truly inside that environment. Displaying representations of the user's hands in the environment can also allow the user's hands to interact with virtual objects and/or interfaces (e.g., menus) in the environment displayed by the XR device.

Figure 6A:
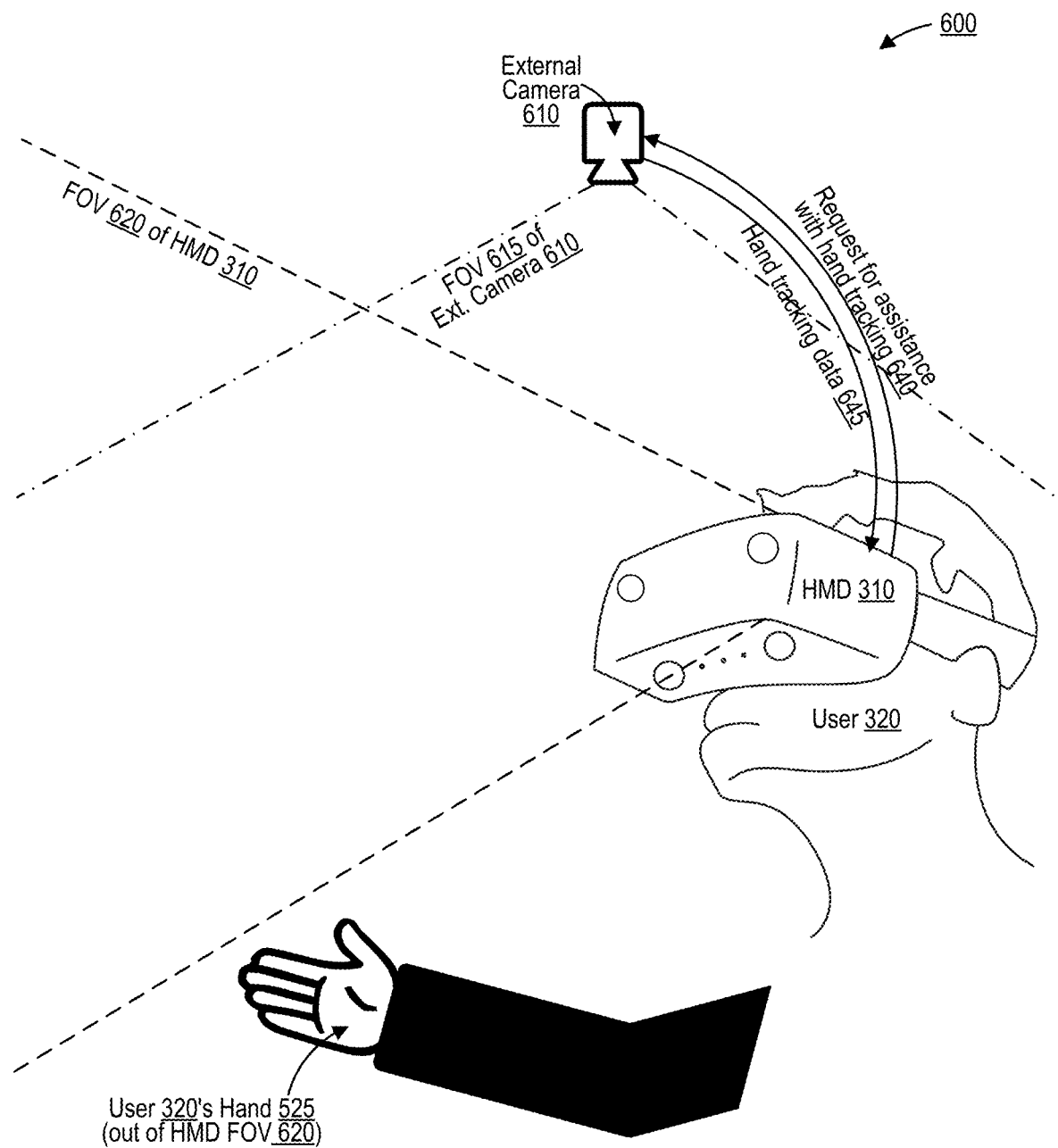
FIG. 6A is a perspective diagram illustrating a user wearing a head-mounted display (HMD) that is used as an XR system and that performs hand tracking to determine a gesture-based input based on a position of the hand of the user even though the hand is out of the field of view (FOV) of the HMD, based on the hand being in the FOV of an external camera, in accordance with some examples.
Figure 6B:
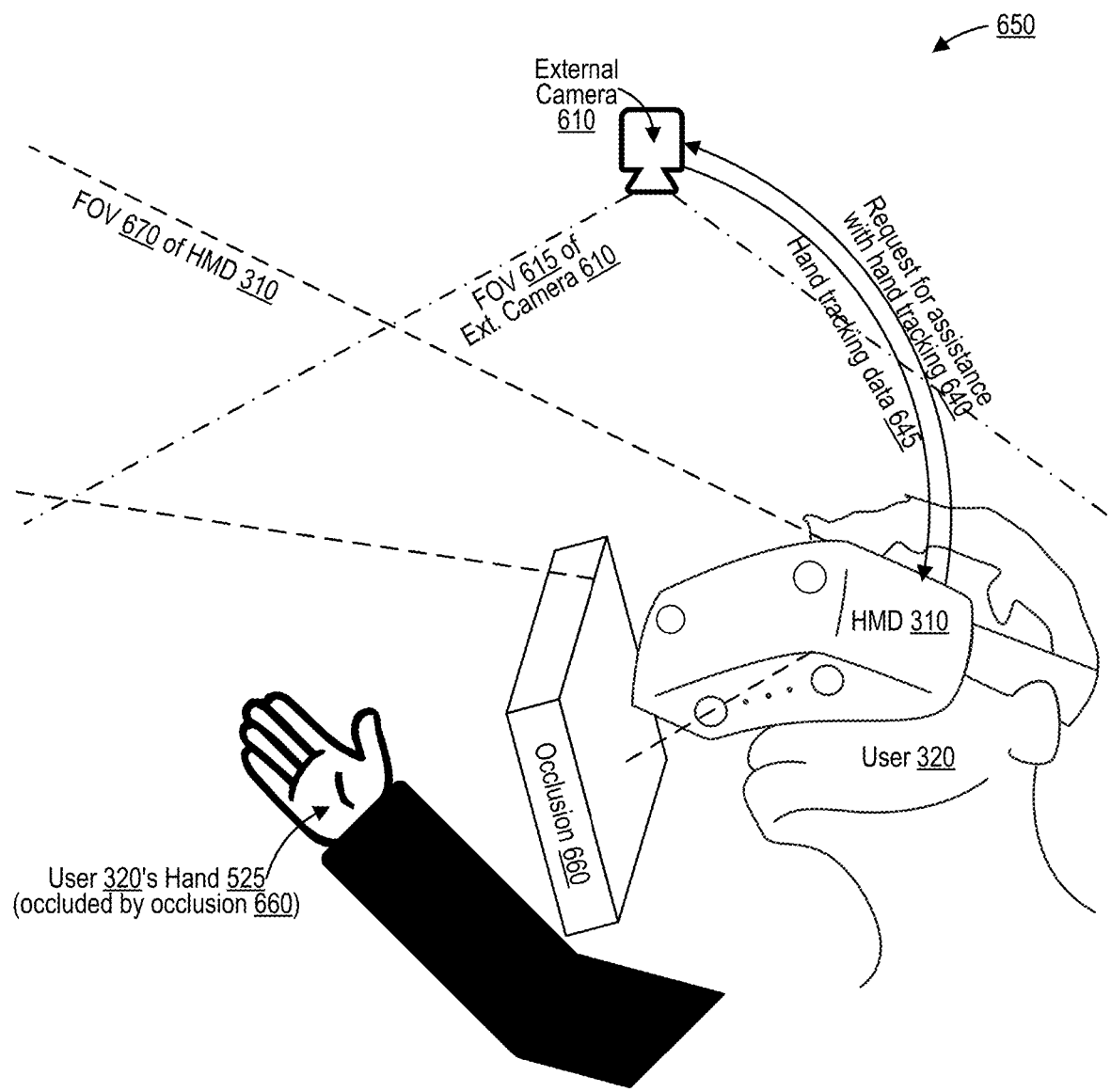
FIG. 6B is a perspective diagram illustrating a user wearing a head-mounted display (HMD) that is used as an XR system and that performs hand tracking to determine a gesture-based input based on a position of the hand of the user even though an occlusion occludes the hand from the field of view (FOV) of the HMD, based on the hand being in the FOV of an external camera, in accordance with some examples.

An XR device can perform object tracking, which can be useful to allow a user to interact with virtual objects and/or interfaces displayed by an XR device using their hands. For instance, an XR device can track one or more hands of a user of the XR device to determine a pose (e.g., position and orientation) of the one or more hands. Hand tracking can be useful to ensure that the pose of representations of the user's hands used by the XR device (e.g., to determine a gesture-based input, for displaying the representation of the one or more hands, etc.) are accurately synchronized with the real-world positions of the user's hands. Other types of tracking can also be performed, including head tracking, body tracking, torso tracking, tracking of a controller used to interact with an XR device, and/or tracking of other objects. In one example, hand tracking can be useful to allow the XR device to accurately render occlusion of the environment by the user's hands, occlusion of the hands by one or more real in the environment or virtual objects displayed by the XR device, occlusion of any real or virtual objects by the hand(s) based on the user holding the real or virtual objects in their hands, etc. In some cases, hand tracking can stop working properly if the user's hands exit the field of view of an XR device's sensors, for instance as illustrated in FIG. 6A discussed below. In other cases, hand tracking can stop working properly if the user's hands are occluded from view of the XR device's sensors, for instance as illustrated in FIG. 6B.

Figure 7:
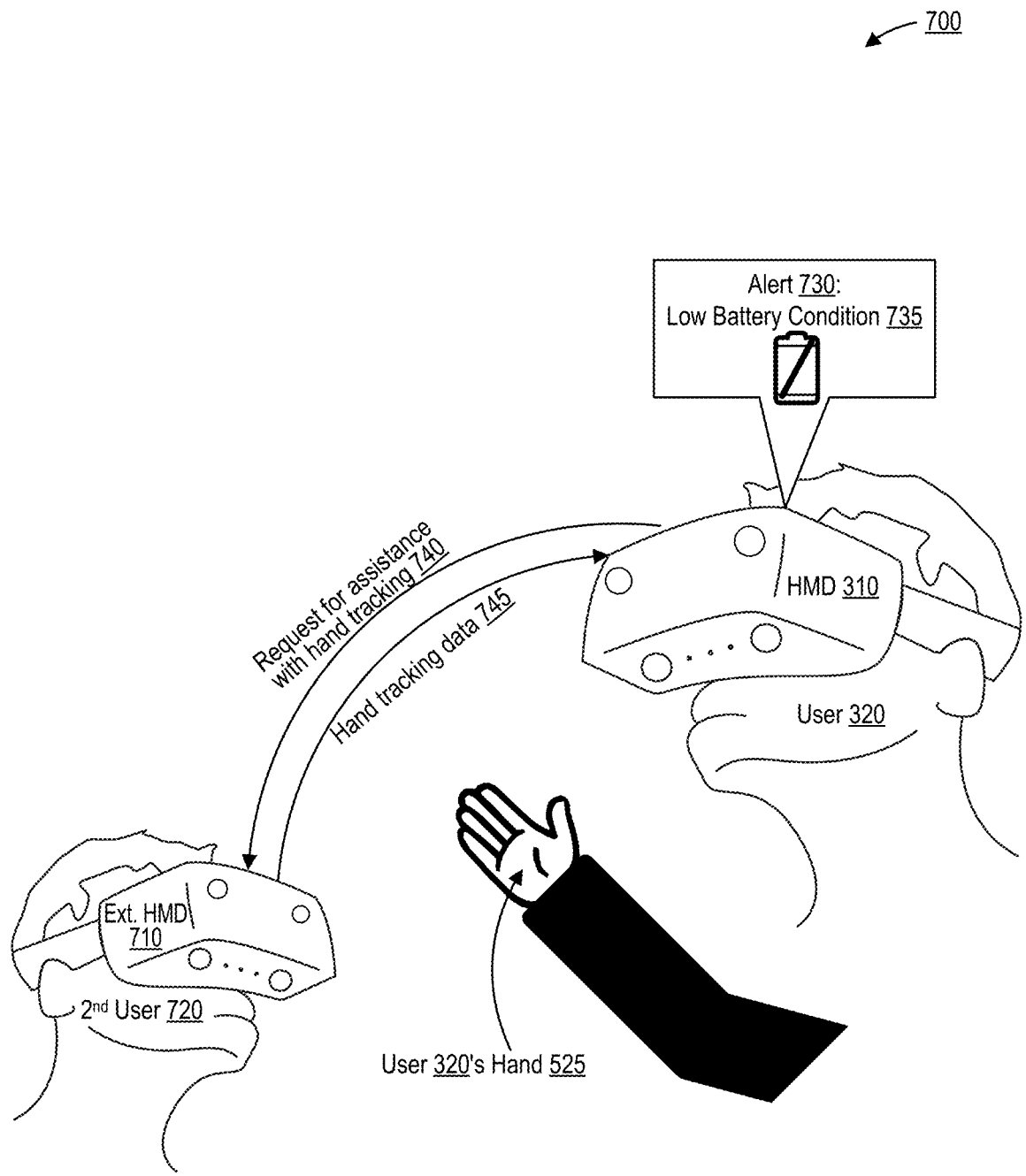
FIG. 7 is a perspective diagram illustrating an external head-mounted display (HMD) device providing assistance with hand-tracking a hand of a user of a HMD that is used as an XR system due to a low battery condition at the HMD, in accordance with some examples.
Figure 8A:
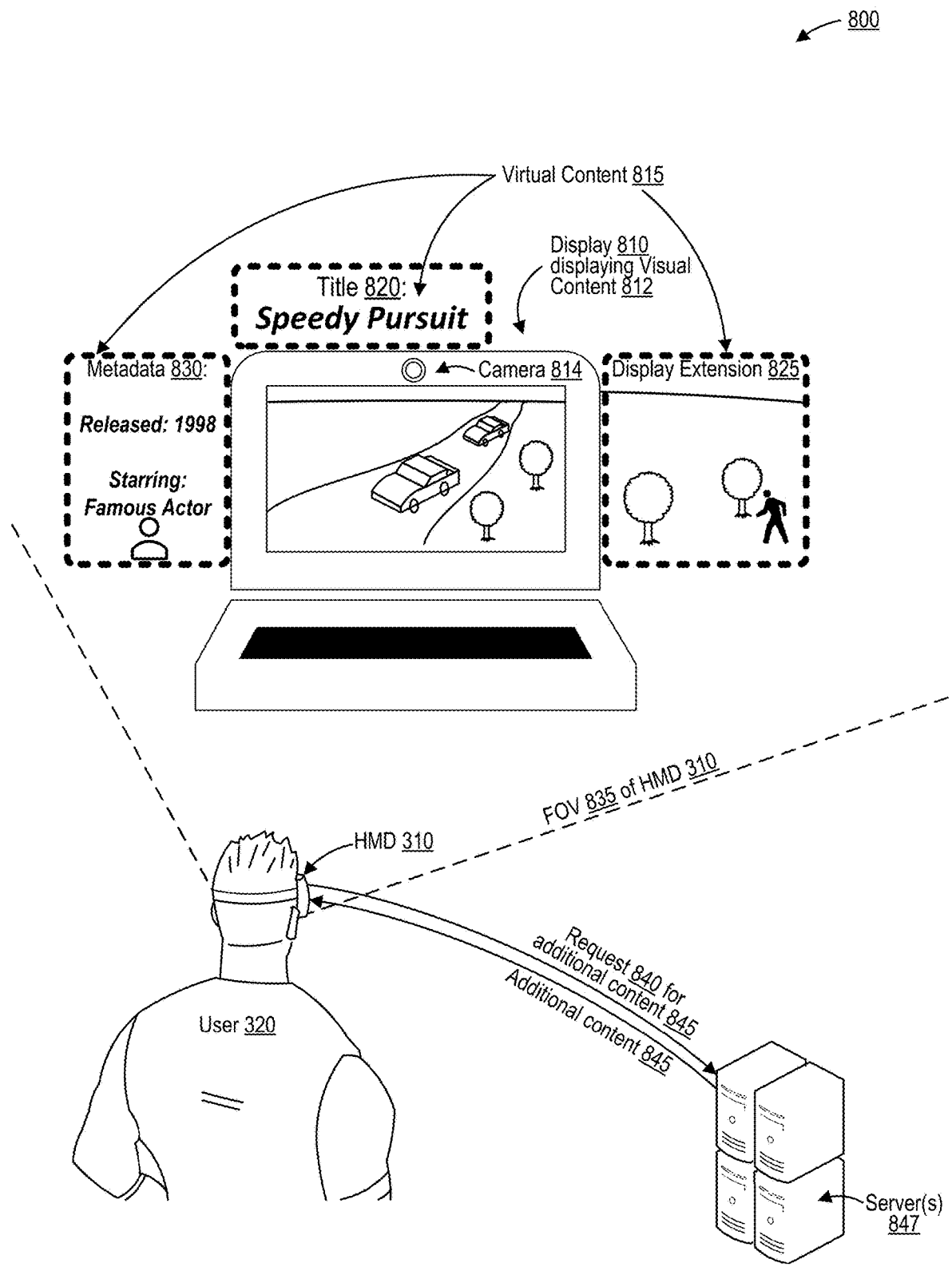
FIG. 8A is a perspective diagram illustrating a user wearing a head-mounted display (HMD) that is used as an XR system and that positions virtual content based on the position of a display and/or visual content displayed on the display in the FOV of the HMD.
Figure 8B:
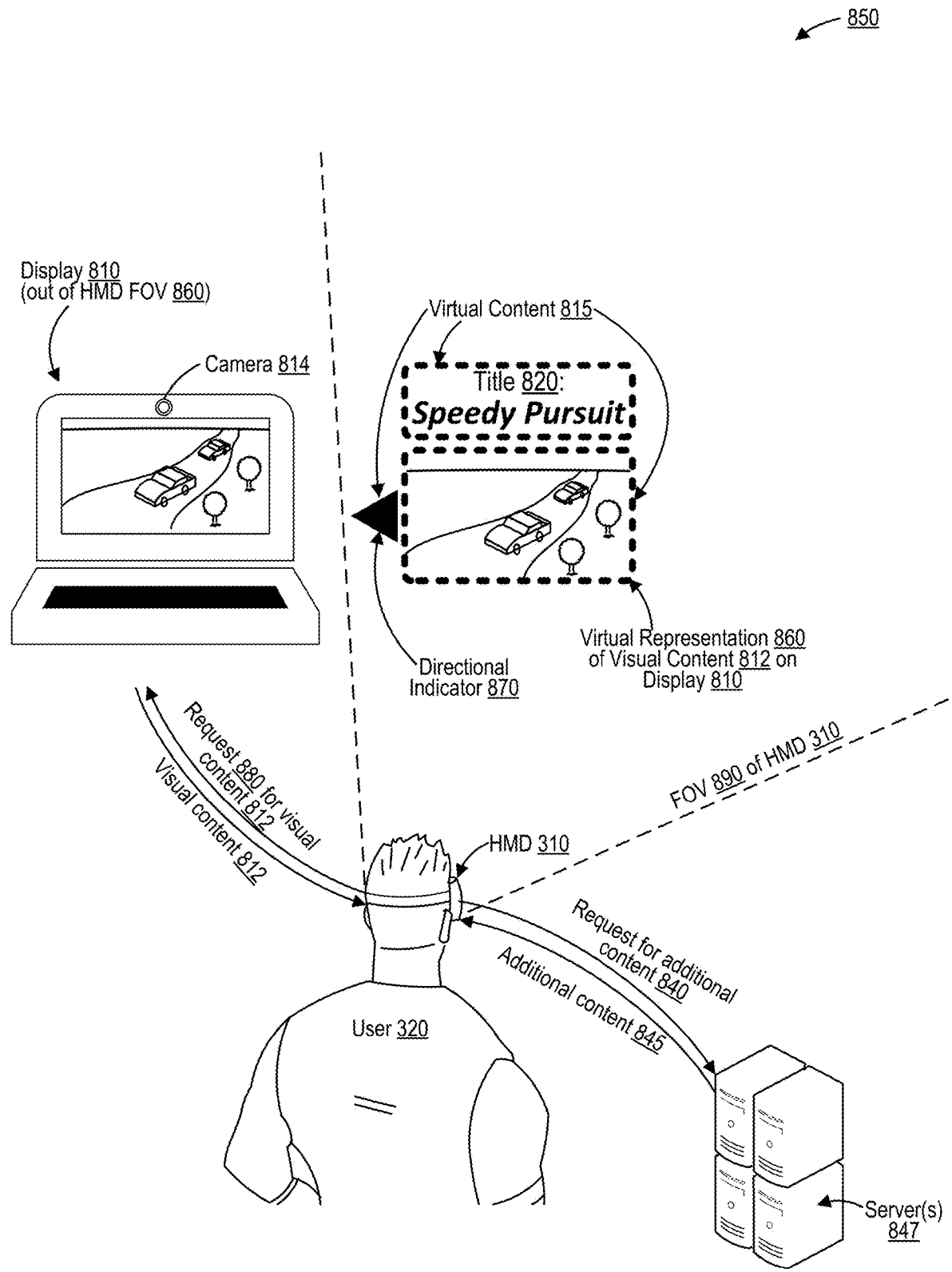
FIG. 8B is a perspective diagram illustrating a user wearing a head-mounted display (HMD) that is used as an XR system and that positions a virtual representation of visual content displayed on a display based on a position of the display and/or the visual content even though the display and/or the visual content are out of the field of view (FOV) of the HMD, in accordance with some examples.

Object tracking (e.g., hand tracking, head tracking, body tracking, etc.) is a computationally expensive process that can quickly drain a battery of an XR device. Thus, it may be useful to offload certain hand tracking tasks based on an operational status of the XR device, such as when an XR device is low on battery power or other computational resources (e.g., as illustrated in FIG. 7). In some XR systems, it may also be useful to track other types of objects. For instance, in some XR systems, it may be useful to track a display screen, for instance as illustrated in FIG. 8A-8B.

Techniques are described herein for an imaging device (e.g., an XR device) to make use of one or more data streams from one or more external devices. For instance, an image may be received from an image sensor of the imaging device. The image can be an image of a portion of an environment that includes an object. The object may or may not be present in the portion of the environment depicted in the image. The object can be, for example, a hand of a user of the imaging device, a head of the user, a body of the user, another body part of the user of the imaging device, a display screen, image media content displayed on the display screen, video media content displayed on the display screen, a person, an animal, a vehicle, a plant, another XR device (in addition to the imaging device, which may be an XR device), another object, or a combination thereof.

The imaging device can identify a data stream from an external device. For instance, the imaging device can identify the data stream from the external device based on the image received from the image sensor (e.g., by identifying the data stream depicted in the image, such as media content being displayed on an external display device that is depicted in the image), based on one or more transmissions of the data stream to the imaging device from the external device (e.g., over a wireless network or wired connection), based on user input, and/or based on other factors. The imaging device can detect a condition, such as based on the image, the data stream, an operational status of the imaging device, any combination thereof, and/or based on other factors. In some examples, the condition can be based on the imaging device losing track of the object (e.g., because the tracked object has moved out of an FOV of the imaging device, is occluded from the view of the imaging device by a real-world or virtual object, etc.), the imaging device being low on computational resources (e.g., low on power and/or based on other operational status of the apparatus), the imaging device detecting visual media content (or a representation thereof) within the image, based on a user input or setting that requests using the external device rather than the imaging device (e.g., XR device) when available for a particular function (e.g., displaying content, tracking an object such as a hand, head, or body of a user), based on a user input or setting indicating a preference that a device (e.g., the external device) be used for a particular function when plugged into the imaging device, that a privacy and/or security is a factor (which could also be based on a user input or setting), based on a user input (e.g., a user input requesting that resources be offloaded to the external device, such as a user input requesting to turn off the imaging device, a user input requesting to turn an external device such as a light on or off through a home automation application running on the imaging device, etc.), based on capabilities of an image sensor of the imaging device (e.g., when an infrared (IR) sensor on one device is useful where ambient lighting is inadequate, when an object being tracked is moving fast and the image sensor with a higher frame rate is more appropriate, etc.), or any combination thereof.

In response to detecting the condition, the imaging device can generate an output. For instance, based on detecting the condition, the imaging device can generate a merged dataset by merging or combining data from the data stream with the image captured by the image sensor. In some cases, in response to detecting the condition, the imaging device can determine a location of at least a part of the object in the environment based on the data stream, the image, the merged dataset, or any combination thereof. The imaging device can generate and output content that is based on the location of at least the part of the object in the environment. For instance, if the object is the user's hand, the content generated and/or output by the imaging device can position a virtual object held by the user's hand accurately based on the location of the user's hand, even if the user's hand is not depicted in the image. If the object is a display screen and/or visual content displayed on the display screen, the content generated and/or output by the imaging device can position virtual content adjacent to, or with some other predetermined relative positioning relative to, the position of the display screen and/or the visual content displayed on the display screen. The content output by the imaging device can include at least a portion of the merged dataset. The imaging device and the external device may perform a privacy negotiation. For instance, the external device can identify to the imaging device what the imaging device can and cannot use the data stream from the external device for, and vice versa.

In a first illustrative example, the external device includes an external camera, and the data stream from the external device includes a camera feed (e.g., one or more images) from the external camera. The external camera can be a camera from another imaging device (e.g., another XR device) or from another camera. The external camera can be in the same environment as the imaging device, and/or can have the same environment in its FOV as the imaging device has in its FOV. The condition may include, for example, that the imaging device has lost track of the user's hand(s) and cannot properly perform hand tracking. For example, the user may have moved their hand(s) out of the field of view of the imaging device (e.g., as in FIG. 6A) and/or an occlusion may have occluded the user's hand(s) from the perspective of the camera(s) of the imaging device (e.g., as in FIG. 6B). The user's hand(s) may be depicted in the camera feed from the external camera, however. The imaging device can use the camera feed from the external camera to help identify where the user's hands are relative to content depicted in the image captured by the image sensor of the imaging device. In some cases, the external device can include a processor that can perform preliminary processing, for instance by performing hand detection and/or hand tracking using images from the camera feed from the external camera. The external device can send image(s) from the camera feed and/or the data corresponding to the preliminary processing to the imaging device. The content generated and/or output by the imaging device can include modifications to the image based on the hand tracking, such as incorporation of virtual content into the image. The virtual content can be positioned on (or relative to) the display of the imaging device based on the position(s) of the user's hand(s).

In a second illustrative example, the external device includes an external camera, and the data stream from the external device includes a camera feed (e.g., one or more images) from the external camera. The external camera can be a camera from another imaging device (e.g., another XR device) or from another camera. The external camera can be in the same environment as the imaging device, and/or can have the same environment in its FOV as the imaging device has in its FOV. In such an example, the condition can be based an operational status of the XR device. For example, the condition can be based on detecting that the imaging device is low on battery power, data bandwidth, processing bandwidth, another computational resource, or a combination thereof. The imaging device can use the camera feed from the external camera to help perform hand tracking or other function(s) that might be battery-intensive, bandwidth-intensive, processing-intensive, otherwise use a large amount of computational resources, or a combination thereof. As in the first illustrative example, the external device in the second illustrative example can perform preliminary processing (e.g., by performing hand detection and/or tracking on images from the camera feed from the external camera). The external device can send (pre-processed) image(s) from the camera feed and/or the data corresponding to the preliminary processing to the imaging device. The content generated and/or output by the imaging device can include modifications to the image based on the hand tracking, such as incorporation of virtual content into the image based on hand position(s).

In a third illustrative example, the external device includes a display screen. The external device, in this example, can be a television, a laptop computer, a desktop computer monitor, a smart home device or assistant, a video game console monitor, a mobile handset with a display screen, a wearable device with a display screen, a television display screen, another device with a display screen, a display screen on its own, or a combination thereof. The data stream from the external device can include the visual media content displayed on the display screen. The image captured by the imaging device can include a representation of the display screen of the external device, and thus can include a representation of the visual media content displayed on the display screen of the external device. The condition may include detection of the representation of the display screen, and/or of the representation of the visual media content displayed on the display screen, within the image captured by the image sensor of the imaging device. For example, a user of the imaging device can see, through the user's imaging device, the external device displaying the visual media content on its display screen. For example, the visual media content may be a television show, a movie, a video game, a slide show, another type of image, another type of video, or some combination thereof. Merging the data from the data stream (the visual media content) with the image can include adding information to the representation of the visual media content in the image. The added information can, for example, include information about actors in a scene of a television show or movie, information about deleted scenes, information about video game statistics such as health, and/or other information. To the user of the imaging device, the added information can appear adjacent the representation of the visual media content, or overlaid over the representation of the visual media content, or otherwise positioned relative to the representation of the visual media content.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110, such as a portion of a real-world environment, and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, high dynamic range (HDR), depth of field, and/or other image capture properties.

The focus control mechanism 125B of the control mechanisms 120 can obtain a focus setting. In some examples, focus control mechanism 125B stores the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 5010 discussed with respect to the computing device 5000. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, object detection, object tracking, descriptor generation, receipt of inputs, managing outputs, managing memory, or some combination thereof. The image processor 150 may store image frames and/or processed images in random access memory (RAM) 140/5020, read-only memory (ROM) 145/5025, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 5035, any other input devices 5045, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a smart home device or assistant, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 Wi-FI communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Systems, apparatuses, processes, and computer-readable media are described herein for identifying and tracking locations of objects within one or more images. Each of the images may be captured using an image sensor 130 of an image capture device 150A, an image capture and processing system 100, or a combination thereof. Each of the images may be processed using an image processing device 105B, an image capture and processing system 100, or a combination thereof. The image capture and processing system 100 may be a part of an XR system or XR device, such as the XR system 210 of FIG. 2. The image capture and processing system 100 may be a sensor of an XR system or XR device, such as the sensors 215 of the XR system 210 of FIG. 2. The image capture and processing system 100 may be a part of an external device, such as the external device 220 of FIG. 2. The image capture and processing system 100 may be a sensor of an external device, such as the sensors 225 of the external device 220 of FIG. 2.

Figure 2:
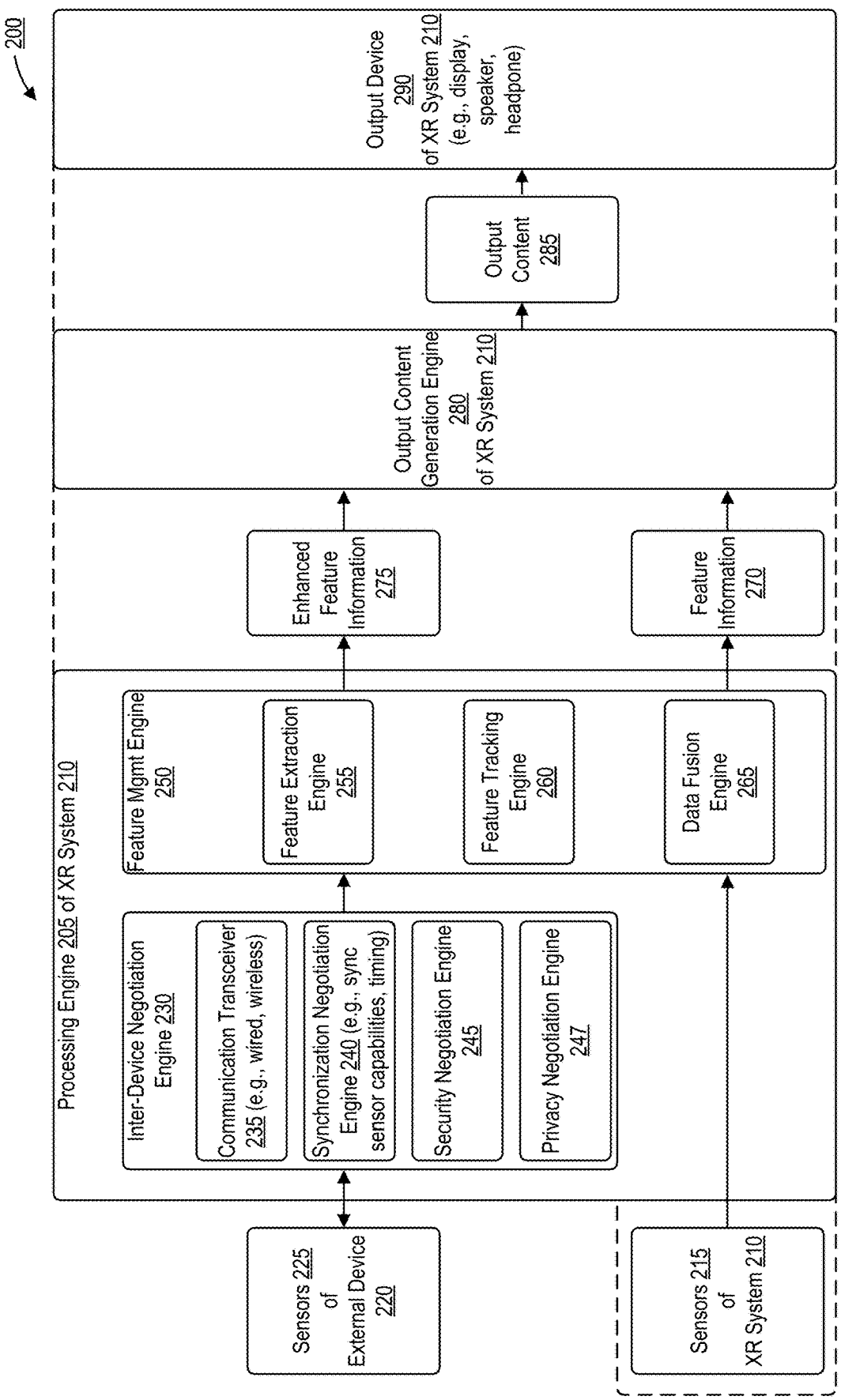
FIG. 2 is a block diagram illustrating an example architecture of an extended reality (XR) system, in accordance with some examples.

FIG. 2 is a block diagram 200 illustrating an example architecture of an extended reality (XR) system 210. The XR system 210 of FIG. 2 includes one or more sensors 215, a processing engine 205, an output content generation engine 280, and an output device 290.

The processing engine 205 of the XR system 210 can receive sensor data from one or more sensors 215 of the XR system 210. The one or more sensors 215 of the XR system 210 can include, for example, one or more image sensors 130, one or more accelerometers, one or more gyroscopes, one or more inertial measurement units (IMUs), one or more light detection and ranging (LIDAR) sensors, one or more radio detection and ranging (RADAR) sensors, one or more sound detection and ranging (SODAR) sensors, one or more sound navigation and ranging (SONAR) sensors, one or more time-of-flight (ToF) sensors, one or more structured light sensors, one or more microphones, one or more other sensors described herein, or combinations thereof. In some examples, the one or more sensors 215 can be coupled to the processing engine 205 through one or more wired and/or wireless sensor connectors. In some examples, the sensor data can include one or more images. The one or more images can include still images, video frames of one or more videos, or combinations thereof. The one or more images can be referred to as still images, image frames, video frames, frames, or a combination thereof. A box with a dashed line is illustrated around the one or more sensors 215 of the XR system 210 to indicate that the one or more sensors 215 may be considered a part of the XR system 210 and/or of the processing engine 205.

The processing engine 205 of the XR system 210 can receive sensor data from one or more sensors 225 of an external device 220. The one or more sensors 225 of the external device 220 can include, for example, one or more image sensors 130, one or more accelerometers, one or more gyroscopes, one or more IMUs, one or more LIDAR sensors, one or more RADAR sensors, one or more SODAR sensors, one or more SONAR sensors, one or more ToF sensors, one or more structured light sensors, one or more microphones, one or more other sensors described herein, or combinations thereof. In some examples, the external device 220 and/or one or more sensors 225 can be coupled to the processing engine 205 through one or more wired and/or wireless connections. The one or more images can be referred to as still images, image frames, video frames, frames, or a combination thereof.

The processing engine 205 of the XR system 210 includes an inter-device negotiation engine 230 that can negotiate with the external device 220. The inter-device negotiation engine 230 can include a communication transceiver 235. The communication transceiver 235 can include one or more wired communication transceivers, one or more wireless communication transceivers, or combinations thereof. The inter-device negotiation engine 230 of the XR system 210 can use the communication transceiver 235 to receive the sensor data from the sensors 225 of the external device 220. The inter-device negotiation engine 230 of the XR system 210 can also use the communication transceiver 235 to send negotiation data to the external device 220 and/or receive negotiation data from the external device 220 as part of one or more negotiations, such as a synchronization negotiation, a security negotiation, a privacy negotiation, or a combination thereof.

The inter-device negotiation engine 230 of the XR system 210 can include a synchronization negotiation engine 240 that synchronizes sensor data received from the one or more sensors 225 of the external device 220 with sensor data received from the one or more sensors 215 of the XR system 210. For instance, the sensor data received from the one or more sensors 225 of the external device 220 can be tagged with timestamps at which individual elements (e.g., individual images) of the sensor data were captured by the one or more sensors 225 of the external device 220. Likewise, the sensor data received from the one or more sensors 215 of the XR system 210 can be tagged with timestamps at which individual elements (e.g., individual images) of the sensor data were captured by the one or more sensors 215 of the XR system 210. The synchronization negotiation engine 240 can match an element of the sensor data from the one or more sensors 225 of the external device 220 with a corresponding element of the sensor data from the one or more sensors 215 of the XR system 210 based on the corresponding timestamps matching as closely as possible. In an illustrative example, the one or more sensors 215 of the XR system 210 can capture an image with a timestamp of 4:30.3247, and the one or more sensors 225 of the external device 220 can capture images with timestamps of 4:29.7930, 4:30.0139, 4:30.3923, and 4:30.8394. The synchronization negotiation engine 240 can identify that the 4:30.3923 timestamp from the sensor data of the one or more sensors 225 of the external device 220 matches most closely to the 4:30.3247 timestamp from the sensor data of the one or more sensors 215 of the XR system 210. Thus, the synchronization negotiation engine 240 can synchronize the image corresponding to the 4:30.3923 timestamp from the sensor data of the one or more sensors 225 with the image corresponding to the 4:30.3247 timestamp from the sensor data of the one or more sensors 215 of the XR system 210. In some examples, the synchronization negotiation engine 240 can send a request to the external device 220 for sensor data most closely matching a timestamp of sensor data from the one or more sensors 215 of the XR system 210. The synchronization performed by the synchronization negotiation engine 240 can be based on sensor capabilities. For example, if the sensors 215 of the XR system 210 capture images at 90 frames per second (fps), while the sensors 225 of the external device 220 capture images at 30 fps, then the synchronization negotiation engine 240 can synchronize every third image captured by the sensors 215 of the XR system 210 with an image captured by the sensors 225 of the external device 220.

The inter-device negotiation engine 230 of the XR system 210 can include a security negotiation engine 245. The security negotiation engine 245 can perform a security handshake between the XR system 210 and the external device 220. The security handshake can include, for example, a transport layer security (TLS) handshake, a secure sockets layer (SSL) handshake, or a combination thereof. The security handshake can identify a version of an encryption protocol to be used between the XR system 210 and the external device 220, decide on a cipher suite to be used between the XR system 210 and the external device 220, authenticate the identities of the XR system 210 and/or the external device 220 using one or more digital signatures (and/or one or more certificate authorities). The security handshake can generate session keys in order to use symmetric encryption after the handshake is complete. The security handshake can generate or retrieve an asymmetric keypair for each of the XR system 210 and the external device 220, and can transfer public keys from each keypair from the device on which they are generated or retrieved to the other device. The XR system 210 and the external device 220 can then communicate via encrypted communication, using asymmetric and/or symmetric encryption, following the security handshake.

The inter-device negotiation engine 230 of the XR system 210 can include a privacy negotiation engine 247. The privacy negotiation engine 247 can request sensor data from the sensors 225 of the external device 220 for use for an identified purpose, for instance for hand tracking as in FIG. 6A, 6B, or 7. The external device 220 can grant or deny the XR system 210 access to the sensor data from the sensors 225 of the external device 220 for the identified purpose. In some examples, the external device 220 can include a whitelist of purposes for which the external device 220 can permit sharing of sensor data from the sensors 225 of the external device 220. In some examples, the external device 220 can include a blacklist of purposes for which the external device 220 cannot permit (and instead must deny) sharing of sensor data from the sensors 225 of the external device 220. In some examples, the privacy negotiation engine 247 can request sensor data from the sensors 225 of the external device 220 for use for multiple purposes, but external device 220 can respond indicating that the external device 220 only permits sharing the sensor data from the sensors 225 of the external device 220 for a subset of the multiple purposes. The privacy negotiation engine 247 can respect any limitations that the external device 220 identifies on purposes for which the sensor data from the sensors 225 of the external device 220 can be used.

In some examples, the external device 220 can make certain requests or demands of the XR system 210 if the XR system 210 is to be sent the sensor data from the sensors 225 of the external device 220, which the privacy negotiation engine 247 can agree to and execute actions corresponding to. For instance, in some examples, the external device 220 can request that the XR system 210 delete the sensor data from the sensors 225 of the external device 220 immediately after use, or a predetermined time period after use. The privacy negotiation engine 247 can agree to this requirement, and can ensure that the XR system 210 delete the sensor data from the sensors 225 of the external device 220 immediately after use, or the predetermined time period after use. In some examples, the external device 220 can request that the XR system 210 not use, discard, or replace certain portions of aspects of the sensor data from the sensors 225 of the external device 220. For instance, the external device 220 can request that the XR system 210 not use or anonymize names, faces, or other sensitive information in the sensor data from the sensors 225 of the external device 220. The privacy negotiation engine 247 can agree to this requirement, and can ensure that the XR system 210 not use, discard, or replace certain portions of aspects of the sensor data from the sensors 225 of the external device 220.

The processing engine 205 of the XR system 210 includes a feature management engine 250. The feature management engine 250 receives the sensor data from the one or more sensors 215 of the XR system 210. The feature management engine 250 receives the sensor data from the one or more sensors 225 of the external device 220. The inter-device negotiation engine 230 may synchronize the sensor data from the one or more sensors 215 of the XR system 210 with the sensor data from the one or more sensors 225 of the external device 220 prior to or contemporaneously with receipt of the sensor data by the feature management engine 250. The inter-device negotiation engine 230 may identify any security and/or privacy limitations, restrictions, and/or requirements prior to or contemporaneously with receipt of the sensor data by the feature management engine 250.

The feature management engine 250 includes a feature extraction engine 255. The feature extraction engine 255 can detect and/or extract features from the sensor data from the one or more sensors 215 of the XR system 210. In some cases, the feature extraction engine 255 can detect and/or extract features from the sensor data from the one or more sensors 225 of the external device 220. For instance, if the sensor data include images, the feature extraction engine 255 can detect and/or extract visual features. Visual features can include distinctive, unique, and/or identifiable parts of an image, such as a part of an image depicting a corner, an edge, a gradient, and/or a blob. A blob may be defined as area in which one or more image properties (e.g., brightness, color, tone, hue, saturation, or a combination thereof) is constant or approximately constant. To detect features and/or extract features in the image, the feature extraction engine 255 can perform a scale-space search, for which the feature extraction engine 255 can use a frame buffer for scale-space search. To detect features in the image, the feature extraction engine 255 can use edge detection, corner detection, blob detection, ridge detection, affine invariant feature detection, or a combination thereof. Edge detection can include, for example, Canny, Deriche, Differential, Sobel, Prewitt, and/or Roberts cross edge detection. Corner Detection can include, for example, Harris operator, Shi and Tomasi, level curve curvature, Hessian feature strength measures, smallest univalue segment assimilating nucleus (SUSAN), and/or features from accelerated segment test (FAST) corner detection. Blob detection can include, for example, Laplacian of Gaussian (LoG), Difference of Gaussians (DoG), Determinant of Hessian (DoH), Maximally stable extremal regions, and/or Principal curvature-based region detector (PCBR) blob detection. Affine invariant feature detection can include Affine shape adaptation, Harris affine, and/or Hessian affine feature detection.

To extract features, the feature extraction engine 255 can generate descriptors for the features. A descriptor for a feature may be generated based on extraction of a local image patch around the feature, and description of the feature as depicted in the local image patch. The feature descriptor may, for example, describe the feature as a collection of one or more feature vectors. Features may be extracted using any suitable technique, such as Scale Invariant Feature Transform (SIFT), Learned Invariant Feature Transform (LIFT), Speed Up Robust Features (SURF), Gradient Location-Orientation histogram (GLOH), Histogram of Oriented Gradients (HOG), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof. In some examples, feature detection and/or feature extraction using the feature extraction engine 255 can include identifying a location of the feature within the image, identifying a location of the feature within a 3D environment, or both.

The feature management engine 250 includes a feature tracking engine 260. The feature extraction engine 255 can track features detected and/or extracted by the feature extraction engine 255 from one image to another image. Feature tracking, as performed by the feature tracking engine 260, can include frame-to-frame tracking, box tracking, Kanade-Lucas-Tomasi (KLT) feature tracking, meanshift feature tracking, or combinations thereof. Some features represent portions of an object within the environment, such as a hand or a display screen. The feature tracking engine 260 can track movement of the object within the environment by tracking of features of the object within the environment relative to the features of the environment.

The feature management engine 250 includes a data fusion engine 265. In some examples, the data fusion engine 265 can match features detected and/or extracted by the feature extraction engine 255 from the sensor data received from the one or more sensors 215 of the XR system 210 with features detected and/or extracted by the feature extraction engine 255 from the sensor data received from the one or more sensors 225 of the external device 220. In some cases, the one or more sensors 215 of the XR system 210 and the one or more sensors 225 of the external device 220 may be arranged such that at least some overlap exists between scenes of the real-word environment captured (in the case of image sensors) and/or sensed (in the case of non-imaging sensors) by the respective sensors. In some examples, the data fusion engine 265 can match features tracked by the feature tracking engine 260 from the sensor data from the one or more sensors 215 of the XR system 210 with features tracked by the feature tracking engine 260 from the sensor data from the one or more sensors 225 of the external device 220. For instance, the data fusion engine 265 can identify a single three-dimensional point (with a three-dimensional set of coordinates) of a particular feature detected, extracted, and/or tracked in both the sensor data from the one or more sensors 215 of the XR system 210 and the sensor data from the one or more sensors 225 of the external device 220. By matching a few features in common in both sets of sensor data, the data fusion engine 265 can also map features that are in one set of sensor data but not the other relative to the features that are in both sets of sensor data. Thus, the data fusion engine 265 can locate features in the sensor data from the one or more sensors 225 of the external device 220 that are not present in the sensor data from the one or more sensors 215 of the XR system 210 relative to features that are present in the sensor data from the one or more sensors 215 of the XR system 210. Likewise, the data fusion engine 265 can locate features in the sensor data from the one or more sensors 215 of the XR system 210 that are not present in the sensor data from the one or more sensors 225 of the external device 220 relative to features that are present in the sensor data from the one or more sensors 225 of the external device 220. In some examples, certain operations discussed herein as performed by the data fusion engine 265, such as feature mapping, can be performed regardless of whether or not the processing engine 205 of the XR system 210 receives the sensor data from the one or more sensors 225 of the external device 220. In some examples, certain operations discussed herein as performed by the data fusion engine 265, such as feature mapping, can be performed by the feature extraction engine 255, the feature tracking engine 260, or another part of the feature management engine 250.

In some examples, the feature management engine 250 can perform pose estimation of the pose of the XR system 210 (and/or of each of the sensors 215 of the XR system 210) within the real-world environment that the XR system 210 is in. Pose can include location in 3-dimensional space, such as a set of 3-dimensional translational coordinates (e.g., in a horizontal (x) direction, vertical (y) direction, and depth (z) direction). Additionally or alternatively, pose can include orientation (e.g., pitch, yaw, and/or roll). The feature management engine 250 can estimate the pose based on features that have been detected and/or extracted by the feature extraction engine 255, based on features that have been tracked by the feature tracking engine 260, based on features that have been fused and/or mapped by the data fusion engine 265, or a combination thereof. In some aspects, the feature management engine 250 can perform stereo matching for features, for instance where the sensors 215 and/or the sensors 225 include groups (e.g., pairs) of image sensors representing multiscopic views of the same scene. In some aspects, the feature management engine 250 can perform mapping, such as map densification, key frame addition, key frame removal, bundle adjustment, loop closure detection, relocalization, and/or one or more other simultaneous localization and mapping (SLAM) operations. In some examples, the pose of the XR system 210 (and/or each of the sensors 215 and/or sensors 225) can be determined independently of feature detection and/or extraction. For instance, a pose may be determined using a positioning procedure, such as using positioning reference signals (PRS), beacon signals, ToF measurements, or the like. For stationary sensors or external devices, a pose may be retrieved from a memory of the sensor or external device or a separate server where it may have been previously stored (e.g., during a calibration process, during setup of a device based on user input indicating a location of a sensor or external device, etc.).

The feature management engine 250 can output feature information 270 based on features detected, extracted, and/or tracked from the sensor data from the one or more sensors 215 of the XR system 210 using the feature extraction engine 255 and/or the feature tracking engine 260. The feature management engine 250 can output enhanced feature information 275 based on features detected, extracted, tracked, and/or merged (combined) from both the sensor data from the one or more sensors 215 of the XR system 210 and the sensor data from the one or more sensors 225 of the external device 220 using the feature extraction engine 255 and/or the feature tracking engine 260, or using the feature extraction engine 255, the feature tracking engine 260, and/or the data fusion engine 265. In some cases, the enhanced feature information 275 can identify additional features not included in the feature information 270, and can thus represent a more complete feature mapping of an environment represented within the sensor data from the one or more sensors 215 of the XR system 210 and/or the sensor data from the one or more sensors 225 of the external device 220. The enhanced feature information 275 can identify more accurate positions for the features than the feature information 270, and can thus represent a more accurate feature mapping of an environment represented within the sensor data from the one or more sensors 215 of the XR system 210 and/or the sensor data from the one or more sensors 225 of the external device 220.

The XR system 210 can include an output content engine 280. The output content engine 280 can generate output content 285 based on the sensor data from the one or more sensors 215 of the XR system 210, the sensor data from the one or more sensors 225 of the external device 220, and/or virtual content. In some examples, the output content 285 can include an output image that is a modified version of an input image from the sensor data from the one or more sensors 215 of the XR system 210 that is modified in order to add virtual content positioned based on the enhanced feature information 275 (which includes feature information extracted from the sensor data from the one or more sensors 225 of the external device 220). For example, features corresponding to a certain object—such as a hand, or a display screen—in the environment could be in the enhanced feature information 275 but not in the feature information 270 if the object is in the field of view of the one or more sensors 225 of the external device 220 but not in the field of view of the one or more sensors 215 of the XR system 210.

The XR system 210 can output the output content 285 to an output device 290 of the XR system 210. The output device 290 can include, for example, a display, an audio output device, any of the output devices 1035 of FIG. 10, a connector that can couple the XR system 210 to one of the previously-listed types of output devices. In some examples, the output content 285 can include one or more images and/or one or more videos, which the XR system 210 can display using the display of the output device 290. The display can include a display screen, such as a liquid crystal display (LCD) display, a plasma display, a light emitting diode (LED) display, an organic LED (OLED) display, an electronic paper display, an electronic ink display, or a combination thereof. The display can include a projector and/or a projection surface onto which the projector projects an image. The projection surface can be opaque, transparent, or translucent. The display can be a display of a head-mounted display (HMD) 310, a display of XR glasses (e.g., AR glasses), a display 345 of a mobile handset 410, and/or other device. In some examples, the output content 285 can include one or more images of a video, which the XR system 210 can display using the display of the output device 290. In some examples, the output content 285 can include one or more audio clips, which the XR system 210 can play using the audio output device of the output device 290. The audio output device can include, for example, a speaker, a headphone, or a combination thereof.

In some examples, the XR system 210 receives the sensor data of the sensors 225 of the external device 220 directly from the external device 220. In some examples, the XR system 210 receives the sensor data of the sensors 225 of the external device 220 indirectly, from an intermediate device. Examples of an intermediate device can include, for example, a server and/or cloud service that the external device 220 uploads its sensor data to. The negotiations discussed herein as performed between the inter-device negotiation engine 230 of the XR system 210 and the external device 220 can, in some cases, be performed instead between the inter-device negotiation engine 230 of the XR system 210 and the intermediate device.

Figure 3A:
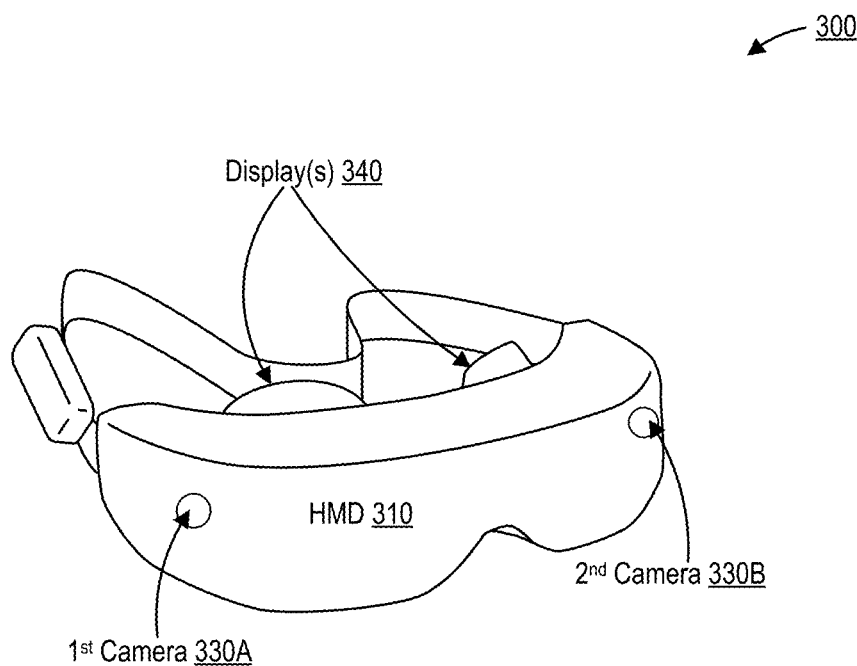
FIG. 3A is a perspective diagram illustrating a head-mounted display (HMD) that is used as an XR system, in accordance with some examples.

FIG. 3A is a perspective diagram 300 illustrating a head-mounted display (HMD) 310 that is used as an extended reality (XR) system 210. The HMD 310 may be, for example, an augmented reality (AR) headset (e.g., AR glasses or smart glasses), a virtual reality (VR) headset, a mixed reality (MR) headset, another type of XR headset, or some combination thereof. The HMD 310 may be an example of an XR system 210 or be part of an XR system 210. The HMD 310 includes a first camera 330A and a second camera 330B along a front portion of the HMD 310. The first camera 330A and the second camera 330B may be examples of the sensors 215 of the XR system 210. In some examples, the HMD 310 may only have a single camera. In some examples, the HMD 310 may include one or more additional cameras in addition to the first camera 330A and the second camera 330B, which may also be examples of the sensors 215 of the XR system 210. In some examples, the HMD 310 may include one or more additional sensors in addition to the first camera 330A and the second camera 330B, which may also be examples of the sensors 215 of the XR system 210.

The HMD 310 may include one or more displays 340 that are visible to a user 320 wearing the HMD 310 on the user 320's head. The one or more displays 340 of the HMD 310 can be examples of the output device 290 of the XR system 210. In some examples, the HMD 310 may include one display 340 and two viewfinders. The two viewfinders can include a left viewfinder for the user 320's left eye and a right viewfinder for the user 320's right eye. The left viewfinder can be oriented so that the left eye of the user 320 sees a left side of the display. The right viewfinder can be oriented so that the right eye of the user 320 sees a right side of the display. In some examples, the HMD 310 may include two displays 340, including a left display that displays content to the user 320's left eye and a right display that displays content to a user 320's right eye.

Figure 3B:
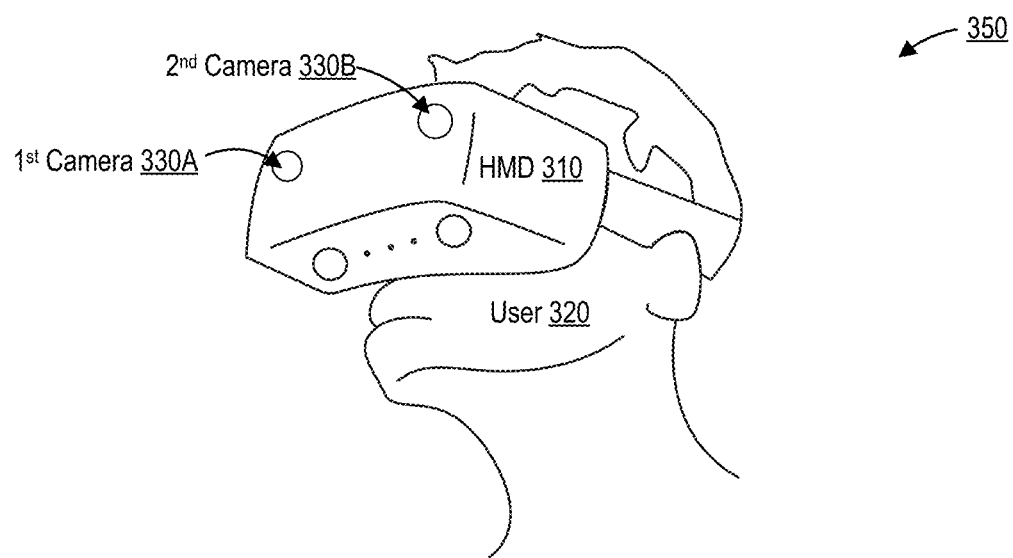
FIG. 3B is a perspective diagram illustrating the head-mounted display (HMD) of FIG. 3A being worn by a user, in accordance with some examples.

FIG. 3B is a perspective diagram 350 illustrating the head-mounted display (HMD) of FIG. 3A being worn by a user 320. The user 320 wears the HMD 310 on the user 320's head over the user 320's eyes. The HMD 310 can capture images with the first camera 330A and the second camera 330B. In some examples, the HMD 310 displays one or more output images toward the user 320's eyes. The output images may be examples of the output content 285. The output images can be based on the images captured by the first camera 330A and the second camera 330B. The output images may provide a stereoscopic view of the environment, in some cases with information overlaid and/or with other modifications. For example, the HMD 310 can display a first display image to the user 320's right eye, the first display image based on an image captured by the first camera 330A. The HMD 310 can display a second display image to the user 320's left eye, the second display image based on an image captured by the second camera 330B. For instance, the HMD 310 may provide overlaid information in the display images overlaid over the images captured by the first camera 330A and the second camera 330B.

Figure 4A:
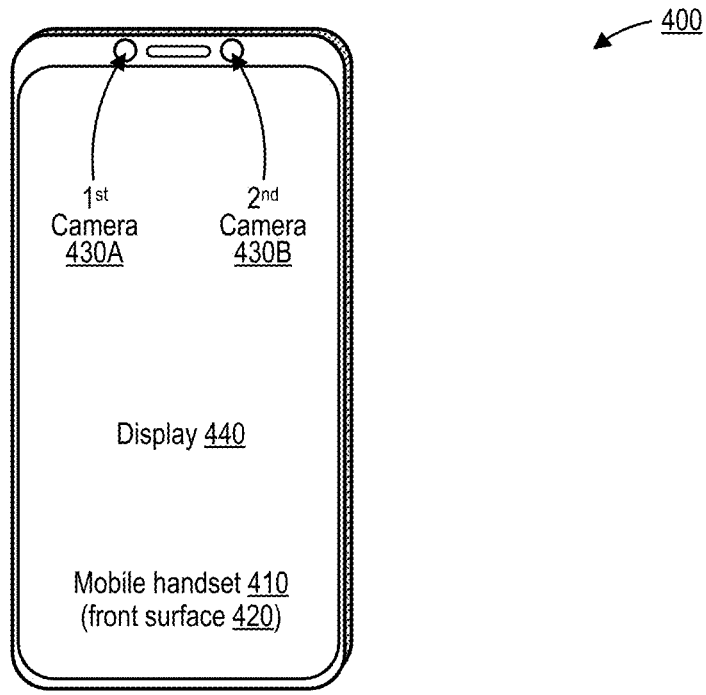
FIG. 4A is a perspective diagram illustrating a front surface of a mobile handset that includes front-facing cameras and is used as an XR system, in accordance with some examples.

FIG. 4A is a perspective diagram 400 illustrating a front surface of a mobile handset 410 that includes front-facing cameras and is used as an extended reality (XR) system 210. The mobile handset 410 may be an example of an XR system 210. The mobile handset 410 may be, for example, a cellular telephone, a satellite phone, a portable gaming console, a music player, a health tracking device, a wearable device, a wireless communication device, a laptop, a mobile device, any other type of computing device or computing system 1100 discussed herein, or a combination thereof. The front surface 420 of the mobile handset 410 includes a display 440. The front surface 420 of the mobile handset 410 may include a first camera 430A and a second camera 430B. The first camera 430A and the second camera 430B may be examples of the sensors 215 of the XR system 210. The first camera 430A and the second camera 430B are illustrated in a bezel around the display 440 on the front surface 420 of the mobile handset 410. In some examples, the first camera 430A and the second camera 430B can be positioned in a notch or cutout that is cut out from the display 440 on the front surface 420 of the mobile handset 410. In some examples, the first camera 430A and the second camera 430B can be under-display cameras that are positioned between the display 440 and the rest of the mobile handset 410, so that light passes through a portion of the display 440 before reaching the first camera 430A and the second camera 430B. The first camera 430A and the second camera 430B of the perspective diagram 400 are front-facing cameras. The first camera 430A and the second camera 430B face a direction perpendicular to a planar surface of the front surface 420 of the mobile handset 410. The first camera 430A and the second camera 430B may be two of one or more cameras of the mobile handset 410. In some examples, the front surface 420 of the mobile handset 410 may only have a single camera. In some examples, the mobile handset 410 may include one or more additional cameras in addition to the first camera 430A and the second camera 430B, which may also be examples of the sensors 215 of the XR system 210. In some examples, the mobile handset 410 may include one or more additional sensors in addition to the first camera 430A and the second camera 430B, which may also be examples of the sensors 215 of the XR system 210. The front surface 420 of the mobile handset 410 also includes a display 440. In some cases, the front surface 420 of the mobile handset 410 includes more than one display 440. The one or more displays 440 of the front surface 420 of the mobile handset 410 can be examples of the output device 290 of the XR system 210.

Figure 4B:
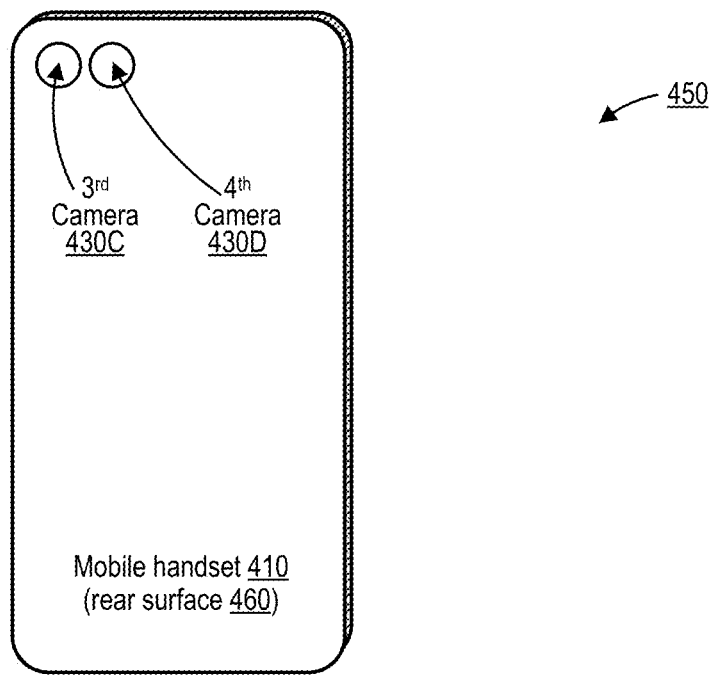
FIG. 4B is a perspective diagram illustrating a rear surface of a mobile handset that includes rear-facing cameras and is used as an XR system, in accordance with some examples.

FIG. 4B is a perspective diagram 450 illustrating a rear surface of a mobile handset that includes rear-facing cameras and is used as an extended reality (XR) system 210. The mobile handset 410 includes a third camera 430C and a fourth camera 430D on the rear surface 460 of the mobile handset 410. The third camera 430C and the fourth camera 430D of the perspective diagram 450 are rear-facing. The third camera 430C and the fourth camera 430D may be examples of the sensors 215 of the XR system 210. The third camera 430C and the fourth camera 430D face a direction perpendicular to a planar surface of the rear surface 460 of the mobile handset 410. While the rear surface 460 of the mobile handset 410 does not have a display 440 as illustrated in the perspective diagram 450, in some examples, the rear surface 460 of the mobile handset 410 may include one or more rear displays. In examples where the rear surface 460 of the mobile handset 410 includes one or more rear displays, the one or more rear displays can be examples of the output device 290 of the XR system 210. If the rear surface 460 of the mobile handset 410 includes one or more rear displays, any positioning layouts of the third camera 430C and the fourth camera 430D relative to the one or more rear displays may be used as discussed with respect to the first camera 430A and the second camera 430B relative to the display 440 of the front surface 420 of the mobile handset 410. The third camera 430C and the fourth camera 430D may be two of one or more cameras of the mobile handset 410. In some examples, the rear surface 460 of the mobile handset 410 may only have a single camera. In some examples, the mobile handset 410 may include one or more additional cameras in addition to the first camera 430A, the second camera 430B, the third camera 430C, and the fourth camera 430D, which may also be examples of the sensors 215 of the XR system 210. In some examples, the mobile handset 410 may include one or more additional sensors in addition to the first camera 430A, the second camera 430B, the third camera 430C, and the fourth camera 430D, which may also be examples of the sensors 215 of the XR system 210.

Figure 5:
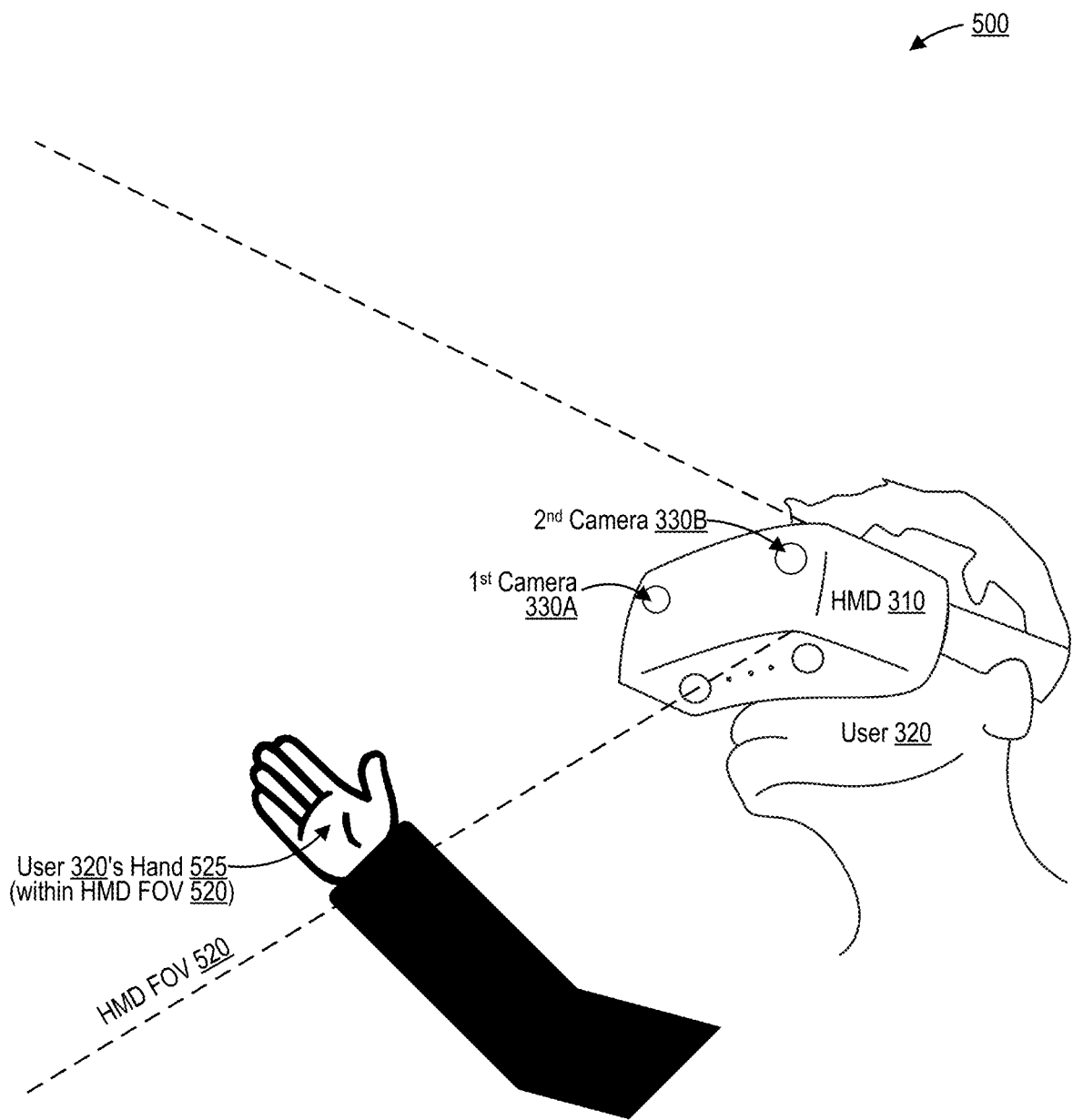
FIG. 5 is a perspective diagram illustrating a user wearing a head-mounted display (HMD) that is used as an XR system and performs hand tracking to determine a gesture-based input based on the hand being in the field of view (FOV) of the HMD, in accordance with some examples.

FIG. 5 is a perspective diagram illustrating a user wearing a head-mounted display (HMD) 310 that is used as an extended reality (XR) system 210 and that performs hand tracking determines a gesture-based input based on a position of the hand 525 of the user 320 being in the field of view (FOV) 520 of the HMD 310. In other examples, the HMD 310 can be used to position a virtual object based on the position of the hand 525 being in the FOV 520 of the HMD 310. The first camera 330A and/or the second camera 330B of the HMD 310 are used as the sensors 215 of the XR system 210. The FOV 520 of the HMD 310 represents the FOV of the first camera 330A and/or the second camera 330B. The FOV 520 of the HMD 310 is illustrated using dashed lines. The hand 525 of the user 320 is in the FOV 520 of the sensors 215 of the HMD 310. Thus, the XR system 210 of the HMD 310 detects, extracts, and/or tracks features of the hand 525 of the user 320 relative to other features of the real-world environment that the user 320 and HMD 310 are located within to identify a pose of the hand 525 of the user 320 relative to the real-world environment that the user 320 and HMD 310 are located within. The pose of the hand 525 can include the location of the hand and/or the orientation (e.g., pitch, yaw, and/or roll) of the hand 525. Based on the pose of the hand 525, the HMD 310 can determine a gesture-based input, such as for controlling a user interface (UI) of the HMD 310.

As noted above, in some cases, the HMD 310 can determine where to display a virtual object relative to the hand 525 based on the determined pose of the hand 525. The virtual object represents a virtual object that the HMD 310 displays to the user 320 using the displays 340, but that does not exist in the real world environment in which the user 320 and the HMD 310 are in. In one illustrative example, the virtual object is a sword, and can be displayed by the HMD 310 as if it is being held by the hand 525 of the user 320. The pose—the location and orientation—of the virtual object depends on the pose of the hand 525. The output content generation engine 280 of the XR system 210 of the HMD 310 can add the virtual object 540 to the output content 285 before the output content 285 is displayed on the display(s) 340 (output on the output devices 290).

FIG. 6A is a perspective diagram 600 illustrating a user 320 wearing a head-mounted display (HMD) 310 that is used as an extended reality (XR) system 210 and that performs hand tracking to determine a gesture-based input based on a position of the hand 525 of the user 320 even though the hand 525 is out of the field of view (FOV) 620 of the HMD 310. The HMD 310 can perform the hand tracking even when the hand 525 is out of the FOV 602 based on the hand 515 being in the FOV 615 of an external camera 610. The FOV 620 of the HMD 310 represents the FOV of one or more cameras and/or other sensors of the HMD 310. The FOV 620 of the HMD 310 is illustrated using dashed lines. The hand 525 of the user 320 is not in the FOV 620 of the HMD 310 because the user 320 has moved the hand 525 too far away from the FOV 620 of the HMD 310. Thus, using its own cameras and/or other sensors, the HMD 310 would be unable to identify and/or track the location of the hand 525 of the user in its position in FIG.

6A. Even though the hand 525 of the user 320 is not in the FOV 620 of the HMD 310, the hand 525 can still be tracked to determine any gesture-based inputs, to determine where to display a virtual object relative to the hand 525 when at least part of the virtual object is still to be displayed in the FOV 620 of the HMD 310 (depending on the illustrated pose of the hand 525 of the user 320), and/or to perform some other function based on a tracked pose of the hand 525.

The XR system 210 of the HMD 310 losing track of the hand 525 (or another object being tracked by the XR system 210) can be a condition that the XR system 210 detects and uses to determine when to perform one or more other functions. The XR system 210 of the HMD 310 can detect this condition in the situation illustrated in FIG. 6A due to the hand 525 exiting the FOV 620 of the HMD 310 or due to no longer detecting the hand 525 in the FOV 620. The XR system 210 of the HMD 310 can send a request for assistance with hand tracking 640 to an external camera 610. The external camera 610 can be an example of the external device 220 of FIG. 2. For instance, the external camera 610 can be part of an external device, such as a laptop computer, a desktop computer, a television, a smart home device or assistant, a mobile device (e.g., a smartphone), a tablet computer, or other external device. One or more image sensors and/or other sensors of the external camera 610 can be examples of the sensors 225 of the external device 220. The XR system 210 of the HMD 310 can perform an inter-device negotiation with the external camera 610 as discussed with respect to the inter-device negotiation engine 230. In response, the external camera 610 can send hand-tracking data 645 as part of a data stream to the XR system 210 of the HMD 310. The hand-tracking data 645 can include sensor data captured by one or more sensors of the external camera 610, such as one or more image sensors. A FOV 615 of the external camera 610 is illustrated using lines with a series of dots and dashes. The FOV 615 of the external camera 610 includes the hand 525 of the user 325. In some examples, the hand-tracking data 645 can be at least partially processed by the external camera 610, for example to detect features, extract features, track features, and/or perform one or more other operations of the feature management engine 250 before the external camera 610 sends the hand-tracking data 645 to the XR system 210 of the HMD 310, which can reduce computational resources (e.g., battery consumption on the HMD 310, amount of processing resources being used, etc.). The XR system 210 of the HMD 310 can use the hand-tracking data 645 to identify the pose of the hand 525 of the user 320 despite the hand 525 not being in the FOV 620 of the HMD 310. Despite the hand 525 not being in the FOV 620 of the HMD 310, the XR system 210 of the HMD 310 can use the hand pose determined based on the hand-tracking data 645 to determine one or more gesture-based inputs being performed by the user (e.g., to control a UI of the HMD 310, such as an application running on the HMD 310), to determine where to display a virtual object in the FOV 620 of the HMD 310 with an accurate pose based on the pose of the hand 525 of the user 320, and/or to perform one or more other functions.

FIG. 6B is a perspective diagram 650 illustrating a user 320 wearing a head-mounted display (HMD) 310 that is used as an extended reality (XR) system 210 and that performs hand tracking to determine a gesture-based input based on a position of the hand 525 of the user 320 when an occlusion 660 (e.g., a real-word object) occludes the hand 525 within the field of view (FOV) 670 of the HMD 310. The HMD 310 can perform the hand tracking even when the hand 525 is occluded based on the hand 525 being in the FOV 615 of an external camera 610. The FOV 670 of the HMD 310 represents the FOV of one or more cameras and/or other sensors of the HMD 310. The FOV 670 of the HMD 310 is illustrated using dashed lines. The hand 525 of the user 320 is in the FOV 670 of the HMD 310 but occluded from the view of the HMD 310 because the FOV 670 is partially occluded by the occlusion 660. The occlusion 660 occludes the hand 525 within the FOV 670 of the HMD 310. Thus, on its own, the HMD 310 would be unable to identify and/or track the location of the hand 525 of the user in its position in FIG. 6B. Even though the hand 525 of the user 320 is occluded in the FOV 670 of the HMD 310, the hand 525 can still be tracked to determine any gesture-based inputs, to determine where to display a virtual object relative to the hand 525 when at least part of the virtual object is still to be displayed in the FOV 670 of the HMD 310 (depending on the illustrated pose of the hand 525 of the user 320), and/or to perform some other function based on a tracked pose of the hand 525.

The XR system 210 of the HMD 310 losing track of the hand 525 (or another object being tracked by the XR system 210) can be a condition that the XR system 210 detects and uses to determine when to perform one or more other functions. The XR system 210 of the HMD 310 can detect this condition in the situation illustrated in FIG. 6B due to the occlusion 660 occluding the hand 525 in the FOV 670 of the HMD 310. As in FIG. 6A, the XR system 210 of the HMD 310 of FIG. 6B can send a request for assistance with hand tracking 640 to an external camera 610. The XR system 210 of the HMD 310 can perform an inter-device negotiation with the external camera 610 as discussed with respect to the inter-device negotiation engine 230. In response, the external camera 610 can send hand-tracking data 645 as part of a data stream to the XR system 210 of the HMD 310. The hand-tracking data 645 can include sensor data captured by one or more sensors of the external camera 610, such as one or more image sensors. The FOV 615 of the external camera 610 is illustrated using lines with a series of dots and dashes. The FOV 615 of the external camera 610 includes the hand 525 of the user 325. In some examples, the hand-tracking data 645 can be at least partially processed by the external camera 610, for example to detect features, extract features, track features, and/or perform one or more other operations of the feature management engine 250 before the external camera 610 sends the hand-tracking data 645 to the XR system 210 of the HMD 310, which can reduce computational resources (e.g., battery consumption on the HMD 310, amount of processing resources being used, etc.). Despite the hand 525 not being in the FOV 620 of the HMD 310, the XR system 210 of the HMD 310 can use the hand-tracking data 645 to identify the pose of the hand 525 of the user 320 despite the hand 525 being occluded in the FOV 670 of the HMD 310. The determined hand pose can be used to determine one or more gesture-based inputs being performed by the user (e.g., to control a UI of the HMD 310, such as an application running on the HMD 310), to determine where to display a virtual object in the FOV 620 of the HMD 310 with an accurate pose based on the pose of the hand 525 of the user 320, and/or to perform one or more other functions.

In some examples, the external camera 610 can be standalone camera device, such as a security camera, as illustrated in FIGS. 6A and 6B. In some examples, the external camera 610 of FIGS. 6A and 6B can be one or more cameras of another HMD 710 (as in FIG. 7), of mobile handset 410, of a laptop computer, of a desktop computer, or of any other type of external device 220.

FIG. 7 is a perspective diagram 700 illustrating an external head-mounted display (HMD) 710 device providing assistance with hand-tracking a hand 525 of a user 320 of an HMD 310 that is used as an extended reality (XR) system 210 due to a low battery condition 735 (as an example of an operational status of the XR device) at the HMD 310. The FOV (not illustrated) of the HMD 310 can be a FOV of one or more cameras and/or one or more sensors of the HMD 310. The FOV (not illustrated) of the HMD 310 may include the hand 525, or may be missing the hand 525. The FOV (not illustrated) of the external HMD 710 can be a FOV of one or more cameras and/or one or more sensors of the external HMD 710. The FOV (not illustrated) of the external HMD 710 may include the hand 525, or may be missing the hand 525.

The XR system 210 of the HMD 310 can detect a condition at the HMD 310 corresponding to a level of a computing resource of the HMD 310 meeting, or being less than, a threshold level. The XR system 210 of the HMD 310 can detect a condition at the HMD 310 corresponding to a level of usage of a computing resource of the HMD 310 meeting, or exceeding, a threshold level. For example, FIG. 7 illustrates the HMD 310 detecting a low battery condition 735 indicating that a battery level of one or more batteries of the HMD 310 meets, or is less than, a threshold battery level (e.g., 50% of full battery level, 40% of full battery level, or other level). An alert 730 is illustrated based on the HMD 310 detecting the low battery condition 735. The XR system 210 of the HMD 310 can send a request for assistance with hand tracking 740 to the external HMD 710. The external HMD 710 can be an example of the external device 220 of FIG. 2. One or more image sensors and/or other sensors of the external HMD 710 can be examples of the sensors 225 of the external device 220. The XR system 210 of the HMD 310 can perform an inter-device negotiation with the external HMD 710 as discussed with respect to the inter-device negotiation engine 230. In response, the external HMD 710 can send hand-tracking data 745 as part of a data stream to the XR system 210 of the HMD 310. The hand-tracking data 745 can include sensor data captured by one or more sensors of the external HMD 710, such as one or more image sensors. In some examples, the hand-tracking data 745 can be at least partially processed by the external HMD 710, for example to detect features, extract features, track features, and/or perform one or more other operations of the feature management engine 250 to reduce computational resources (e.g., reduce battery consumption on the HMD 310, reduce an amount of processing resources being used, etc.), before the external HMD 710 sends the hand-tracking data 745 to the XR system 210 of the HMD 310. The XR system 210 of the HMD 310 can use the hand-tracking data 745 to identify the pose of the hand 525 of the user 320 and/or whether or not the hand 525 is in the FOV (not pictured) of the HMD 310.

Because the HMD 310 is able to offload at least some of its hand tracking tasks to the external HMD 710, the HMD 310 can reduce its battery load and use battery less quickly, and thus can last longer despite its low battery condition 735. In some examples, the HMD 310 can turn off or otherwise disable its cameras and/or other sensors. In some examples, the HMD 310 can reduce capture quality or rate of the sensor data from its sensors, for example reducing from 90 fps image capture to 30 fps capture. In some examples, the HMD 310 can rely, partially or entirely, on the cameras and/or other sensors of the external HMD 710. In some examples the HMD 310 can at least partially turn off or otherwise disable at least some of the functions of the feature management engine 250, such as the feature extraction engine 255, the feature tracking engine 260, and/or the data fusion engine 265. In some examples, the HMD 310 can rely, partially or entirely, on the external HMD 710 to perform at least some of the functions of the feature management engine 250, such as the feature extraction engine 255, the feature tracking engine 260, and/or the data fusion engine 265. In some examples, the HMD 310 can turn off or otherwise disable the displays 340 of the HMD 310. In some examples, the HMD 310 can send its output content 285 to another display device, such as a smartwatch, a laptop, or another display device. These adjustments to the operation of the XR system 210 of the HMD 310 can allow the HMD 310 can reduce its battery load and use battery less quickly, and thus can last longer despite its low battery condition 735.

In some examples, the XR system 210 of the HMD 310 can detect other conditions than the low battery condition 735 of FIG. 7. For instance, detection of the condition can include detection of levels of other computing resources of the HMD 310 meeting, or being less than, a threshold level. Detection of the condition can include detection of levels of usage of a computing resource of the HMD 310 meeting, or exceeding, a threshold level. For example, the condition can be the available memory (e.g., memory 1015, ROM 1020, and/or RAM 1025) of the HMD 310 meeting, or being less than, a threshold memory level. The condition can be the available storage space (e.g., on storage device 1030) of the HMD 310 meeting, or being less than, a threshold level. The condition can be the available network bandwidth of the HMD 310 meeting, or being less than, a threshold network bandwidth level. The condition can be the available processor bandwidth of the HMD 310 meeting, or being less than, a threshold processor bandwidth level. The condition can be the processor usage of the HMD 310 meeting, or exceeding, a threshold processor usage level.

In some examples, the external HMD 710 of FIG. 7 can be an HMD as illustrated in FIG. 7. In some examples, the external HMD 710 can instead be a standalone camera device, (e.g., a security camera) (as in the external camera 610 of FIGS. 6A and 6B), mobile handset 410, or any other type of external device 220.

FIG. 8A is a perspective diagram 800 illustrating a user 320 wearing a head-mounted display (HMD) 310 that is used as an extended reality (XR) system 210 and that positions virtual content 815 in an image displayed by the display(s) 340 of the HMD 310 based on the position of an external display 810 (external relative to the HMD 310) and/or visual (media) content 812 displayed on the external display 810 in the FOV 835 of the HMD 310. As shown in FIG. 8A, the user 320 wearing the HMD 310 is facing the external display 810, which is displaying visual (media) content 812. The external display 810 includes a camera 814. The FOV 835 of the HMD 310 represents the FOV of one or more cameras and/or other sensors of the HMD 310. The FOV 835 of the HMD 310 is illustrated using dashed lines. The external display 810, and the visual (media) content 812 displayed on the display 810, are both in the FOV 835 of the HMD 310.

The XR system 210 of the HMD 310 can detect the external display 810 and/or can detect the visual (media) content 812 displayed on the external display 810 (e.g., in one or more images captured by the one or more cameras and/or other sensors of the HMD 310). Detection of the external display 810 and/or detection of the visual (media) content 812 displayed on the external display 810 can be a condition that the XR system 210 of the HMD 310 detects and uses to determine when to perform one or more other functions (e.g., determining a location of the external display 810 and/or other object in the environment surrounding the HMD 310, perform a function based on the location, etc.). The XR system 210 of the HMD 310 can detect this condition in the situation illustrated in FIG. 8A due to the display 810 and the visual (media) content 812 being in the FOV 835 of the HMD 310.

In some examples, in response to detecting the condition, the XR system 210 of the HMD 310 can send a request 840 for additional (media) content 845 to one or more servers 847. In some examples, the request 840 can be based on the specific visual (media) content 812 detected by the XR system 210 of the HMD 310, for example based on a media recognition system of the XR system 210 of the HMD 310. The request 840 can identify the visual (media) content 812 detected by the XR system 210 of the HMD 310. The one or more servers 847 can provide the additional (media) content 845 to the XR system 210 of the HMD 310. The additional (media) content 845 can be specific to the visual (media) content 812. In some cases, the request 840 can include a representation of the visual (media) content 812 captured by the sensors of the HMD 310, and the one or more servers 847 can recognize the specific visual (media) content 812 based on a media recognition system of the one or more servers 847. The XR system 210 of the HMD 310 can generate virtual content 815 using the additional (media) content 845. The XR system 210 of the HMD 310 can determine the pose (e.g., location and/or orientation) of the virtual content 815 within the FOV 835 of the HMD 310 within the output content 285 based on the pose (e.g., location and/or orientation) of the display 810 and/or visual (media) content 812 within the FOV 835 of the HMD 310. The virtual content 815 may include a title 820 of the visual (media) content 812, identified as "Speedy Pursuit" in FIG. 8A. The title 820 can be displayed adjacent to and above the display 810 and the visual (media) content 812. In one example, the virtual content 815 may include a display extension 825 that extends the display 810 adjacent to and to the right of the display 810 and the visual (media) content 812, for example based on additional widescreen video data in the additional (media) content 845. The virtual content 815 may include metadata 830 about the virtual content 815 adjacent to and to the left of the display 810 and the visual (media) content 812. The metadata 830 may identify a release date (1998) of the virtual content 815 and identify that the visual (media) content 812 stars a famous actor. In some examples, the virtual content 815 can include additional information or content related to the visual (media) content 812, such as deleted scenes. In some examples, at least some of the virtual content 815 can be overlaid over the display 810 and/or the visual (media) content 812. For example, the virtual content 815 can be used to highlight or circle a particular actor or object in the visual (media) content 812. For example, if the visual (media) content 812 is a sports game, the virtual content 815 can highlight or circle a hard-to-see but important object, such as a ball or a hockey puck.

In the context of FIG. 2, the external display 810 can act as the external device 220, and the visual (media) content 812 can act as a data stream from the external device 220 akin to the sensor data from the sensors 225. In some cases, the display 810 can transmit the visual (media) content 812 to the XR system 210 of the HMD 310 instead of or in addition to displaying the visual content 812, so that the XR system 210 of the HMD 310 can more easily detect and/or recognize the visual (media) content 812 in images and/or other sensor data captured by the image sensors and/or other sensors of the HMD 310. In some examples, the one or more servers 847 may act as the external device 220, and the additional (media) content 845 can act as a data stream from the external device 220 akin to the sensor data from the sensors 225.

In another example, the user wearing the HMD 310 can be facing the external display 810 such that the external display 810 is within the FOV of one or more cameras and/or other image sensors. The one or more cameras (and/or other image sensors) of the HMD 310 and the camera 814 (and/or other image sensor) of the external display 810 can be used for object tracking. Similar to that discussed with respect to FIG. 6A and FIG. 6B, based on detecting a condition as noted above, the HMD 310 can determine whether to use the camera/image sensor(s) of the HMD 310, to use the camera/image sensor(s) of the external display 810, or to use the camera/image sensor(s) of the both the HMD and the external display 810 for tracking purposes.

FIG. 8B is a perspective diagram 850 illustrating a user 320 wearing a head-mounted display (HMD) 310 that is used as an extended reality (XR) system 210 and that positions, in an image displayed by the display(s) 340 of the HMD 310, a virtual representation 860 of visual (media) content 812 displayed on a display 810 based on a position of the display 810 and/or the visual (media) content 812 even though the display 810 and/or the visual (media) content 812 are out of the field of view (FOV) 890 of the HMD 310. The user 320 wearing the HMD 310 no longer faces the display 810 that is displaying visual (media) content 812. The FOV 890 of the HMD 310 represents the FOV of one or more cameras and/or other sensors of the HMD 310. The FOV 890 of the HMD 310 is illustrated using dashed lines. The display 810, and the visual (media) content 812 displayed on the display 810, are not within (and are thus missing from) the FOV 890 of the HMD 310.

In one example, the XR system 210 of the HMD 310 can detect the presence of display 810 in the proximity of the HMD 310 (e.g., in wireless communication range of the HMD 310 or detected within the FOV of the HMD 310 at an earlier time), which can be a condition that the XR system 210 of the HMD 310 detects and uses to determine when to perform one or more other functions. In one example, the XR system 210 of the HMD 310 can determine that it has lost track of the display 810 and/or the visual (media) content 812 (e.g., based on determining that the display 810 and/or visual content 812 is no longer within the FOV 890 of the HMD 310), which can be a condition that the XR system 210 of the HMD 310 detects and uses to determine when to perform one or more other functions. The XR system 210 of the HMD 310 can detect such conditions in the situation illustrated in FIG. 8B due to the display 810 and the visual (media) content 812 no longer being in the FOV 890 of the HMD 310, for example because the user 320 has turned his or her head and/or body to the right. In response to detecting the condition, the XR system 210 of the HMD 310 can automatically send a request 880 for the visual (media) content 812 to the display 810 and/or to one or more computing devices associated with the display 810 (e.g., an entertainment device, media center device, or computing system 1000 connected to the display 810). The display 810, and/or the one or more computing devices associated with the display 810, can respond to the request 880 by providing the visual (media) content 812 as part of a data stream. The XR system 210 of the HMD 310 can generate a virtual representation 860 of the visual (media) content 812 as virtual content 815 within the FOV 890 of the HMD 310. In some cases, the XR system 210 of the HMD 310 can generates a directional indicator 870 as virtual content 815 within the FOV 890 of the HMD 310. The directional indicator 870 points toward the position of the display 810 that is displaying the visual (media) content 812. The virtual representation 860 of the visual content 812 can allow the user 320 of the HMD 310 to continue watching the visual (media) content 812 even if the user 320 turns away from the display 810. The user 320 thus does not have to miss any of the visual (media) content 812 even if the user 320 needs to briefly turn away. The directional indicator 870, which points to the left, can let the user 320 know to turn left to face the display 810 that displays the visual (media) content 812 again. Additional virtual content 815 based on the additional (media) content 845 from the one or more servers 847 can also be displayed in the FOV 890 of the HMD 310, such as the title 820 of the virtual (media) content 812.

In the context of FIG. 2, the display 810 can act as the external device 220, and the visual (media) content 812 can act as a data stream from the external device 220 akin to the sensor data from the sensors 225. In some cases, the display 810 can transmit the visual (media) content 812 to the XR system 210 of the HMD 310 instead of or in addition to displaying the visual (media) content 812, so that the XR system 210 of the HMD 310 can more easily detect and/or recognize the visual (media) content 812 in images and/or other sensor data captured by the image sensors and/or other sensors of the HMD 310. In some examples, the one or more servers 847 may act as the external device 220, and the additional (media) content 845 can act as a data stream from the external device 220 akin to the sensor data from the sensors 225.

Other examples of conditions that can cause the HMD 310 to perform one or more functions (e.g., determine a location of an object, request that resources be offloaded to the external device, request for assistance from an external device with hand tracking, etc.) can include a user input or setting that requests using the external device rather than the imaging device (e.g., XR device) when available for a particular function (e.g., displaying content, tracking an object such as a hand, head, or body of a user), a user input or setting indicating a preference that a device (e.g., the external device) be used for a particular function when plugged into the imaging device, that a privacy and/or security is a factor (which could also be based on a user input or setting), based on a user input (e.g., a user input requesting that resources be offloaded to the external device, such as a user input requesting to turn off the imaging device, a user input requesting to turn an external device such as a light on or off through a home automation application running on the imaging device, etc.), based on capabilities of an image sensor of the imaging device (e.g., when an infrared (IR) sensor on one device is useful where ambient lighting is inadequate, when an object being tracked is moving fast and the image sensor with a higher frame rate is more appropriate, etc.), or any combination thereof.

For instance, the HMD 310 or an application running on the HMD 310 can be programmed with a setting (e.g., based on a user input provided to the HMD 310 and/or application, set by default, etc.) indicating a preference to use an external device for a particular function when the external device is available (e.g., physically or wirelessly connected to the HMD 310) and/or when the external device is capable of performing the function. In one example, based on such a setting being selected or otherwise enabled by a user (or set by default in some cases), an external display (e.g., a television, laptop computer, smart home device or assistant, tablet computer, desktop computer, external XR device, etc.) connected to the HMD 310 can be used to display content for the HMD 310. In another example, based on such a setting being selected or otherwise enabled by a user (or set by default in some cases), one or more cameras and/or other sensors of an external device connected to the HMD 310 can be used to track an object (e.g., a hand, head, or body of a user, an additional external device other than the external device performing the tracking).

In some examples, the HMD 310 or an application running on the HMD 310 can be programmed with a privacy or security setting (e.g., based on a user input provided to the HMD 310 and/or application, set by default, etc.) indicating a preference to use an external device when security and/or privacy may be compromised by using the HMD 310. For instance, based on the privacy or security setting being selected or otherwise enabled by a user (or set by default in some cases), the HMD 310 can determine that content displayed on the HMD 310 is viewable by other people and/or cameras and is thus not private or secure. In response to determining that the content is not private/secure, the HMD 310 can send a command to an external device requesting that the external device display the content.

In some cases, the HMD 310 can request assistance from an external device based on the capabilities and/or components of the external device. For instance, the external device may include an image sensor that is not present on the HMD 310. In one example, the image sensor may include an IR sensor that can perform object tracking (e.g., hand tracking, head tracking, body tracking, etc.) when ambient lighting is inadequate (e.g., in low light conditions). In such an example, the HMD 310 can detect when a low light condition is present (e.g., based on analyzing an image captured by a camera of the HMD 310), such as when one or more light values of the image are below a lighting threshold (e.g., below a particular luminance, lux, or other lighting value, such 3 lux or less). In response to detecting the low-light condition, the HMD 310 can send a command to the external device requesting that the external device capture images using the IR sensor and/or any other sensors and either perform object tracking using the images (in which case the external device can send the pose information to the HMD 310) or send the images to the HMD 310 to perform tracking. In another example, the image sensor may include a camera that can capture images at a high frame rate, which can be used to track an object that is moving fast. In such an example, the HMD 310 can detect the object is moving fast and can send a command to the external device requesting that the external device capture images using the high frame rate camera and/or any other sensors and either perform object tracking using the images or send the images to the HMD 310 to perform tracking.

In some examples, a user can provide user input (e.g., a gesture input, pressing a virtual or physical button, etc.) to control whether the HMD 310 or an external device performs a particular function. In one example, even if the HMD 310 battery is above a threshold and the hands are within a FOV of the HMD 310, the user may provide user input to the HMD 310 requesting that the HMD 310 offload object tracking functionality (e.g., hand tracking, head tracking, body tracking, etc.) to an external device (e.g., a television, laptop computer, smart home device or assistant, tablet computer, desktop computer, external XR device, etc.). For instance, the user may plan on using the HMD 310 for an extended period of time (e.g., play a game for a long period of time), which would at some point require a battery based handoff to the external device. In another example, a user may prefer to use the HMD 310 for a function even when the function will drain the battery where performance of the function may be better by the HMD 310 rather than an external device (e.g., based on one or more capabilities or components of the HMD 310). In such an example, a user can provide user input to the HMD 310 to override handoff of a function to an external device.

In some cases, the HMD 310 can detect a condition indicating that an external device will be needed to perform a function or that the HMD 310 is needed to perform a function. In one illustrative example, while performing hand tracking of the hands of a user of the HMD 310, the HMD 310 can determine that the hands are moving toward the edge of the FOV of the HMD 310 and thus (e.g., based on past usage or the nature of the task) that the user will continue moving the hands beyond the FOV of the HMD 310. Before or as the hands move past the FOV, the HMD 310 can send a command to an external device to turn on one or more cameras and begin capturing images or video of the hands. The HMD 310 can request that the external device perform the object tracking and send the pose information of the hands to the HMD 310 or that the external device the images/video to the HMD 310 so that the HMD 310 can perform the tracking. In such an example, the HMD 310 can resume performing the tracking once the hands return into a known FOV of one or more cameras of the HMD 310. In another illustrative example, the HMD 310 can determine that the user is moving away (or will move away) from a FOV one or more sensors (e.g., cameras or other sensors) that are fixed in place (e.g., a camera on a laptop) and that are being used for object tracking. Based on determining the user will exit the FOV of the one or more sensors, the HMD 310 can transition to performing tracking using its own cameras or other sensors (in which case the HMD 310 send a command to the external device to stop performing tracking using its sensors). In some cases, once the HMD 310 and/or external device determines not to use one or more sensors (e.g., cameras) for tracking, the HMD 310 and/or external device can turn off the sensors, which can conserve power, improve privacy/security, etc.

In some examples, the HMD 310 can detect an additional condition that can trigger that HMD 310 to perform a function or resume performance of a function that was previously offloaded to an external device. For instance, as described with respect to the example of FIG. 7, the HMD 310 can offload one or more object tracking tasks (e.g., hand tracking, head tracking, body tracking, etc.) to an external device based on an operational status of the HMD 310 (e.g., when the HMD 310 battery is low on power or other computational resources, such as below a threshold battery level). The HMD 310 can subsequently be charged so that a battery level of the HMD 310 battery is greater than the threshold battery level. Based on detecting that the battery level has exceeded the threshold battery level, the HMD 310 can send a command to the external device requesting that the one or more object tracking tasks be performed, at least in part, by the HMD 310. In response to the command, the external device can stop performing the object tracking task(s) and the HMD 310 can begin or resume performance of the object tracking task(s).

Figure 9:
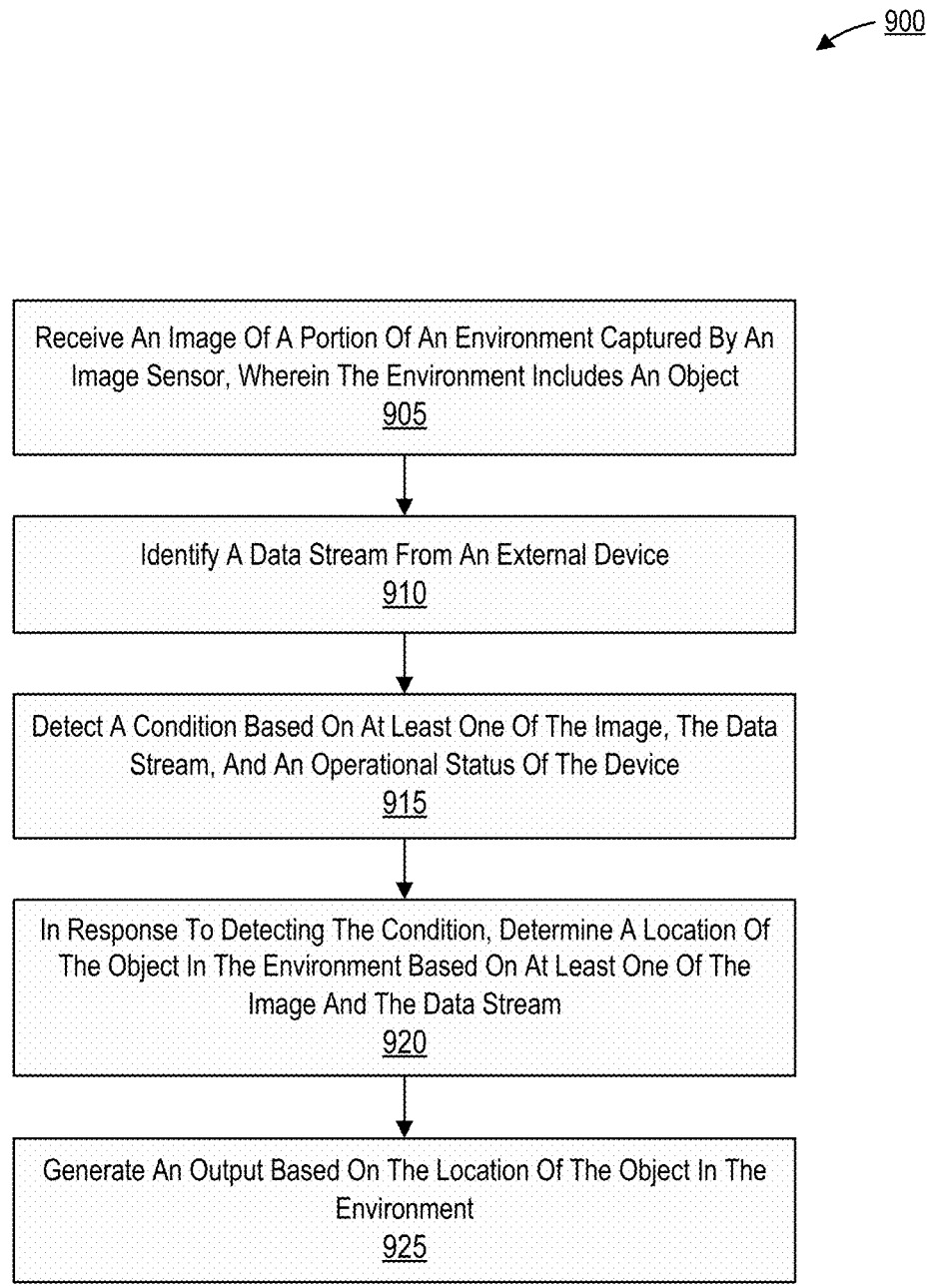
FIG. 9 is a flow diagram illustrating operations for processing image data, in accordance with some examples.

FIG. 9 is a flow diagram illustrating a process 900 for processing image data. The process 900 may be performed by an imaging system. In some examples, the imaging system can be the XR system 210 of FIG. 2. In some examples, the imaging system can include, for example, the image capture and processing system 100, the image capture device 105A, the image processing device 105B, the image processor 150, the ISP 154, the host processor 152, the XR system 210, the processing engine 205, the inter-device negotiation engine 230, the feature management engine 250, the output content generation engine 280, the output device 290, a head-mounted display (HMD) device (e.g., HMD 310), the mobile handset 410, the external HMD device 710, the one or more servers 847, the computing system 1000, or a combination thereof.

At operation 905, the process 900 includes receiving, by a device (e.g., the imaging system), an image of a portion of an environment captured by an image sensor (e.g., an image sensor of the device). The environment includes an object. At operation 910, the process 900 includes identifying a data stream from an external device. Examples of the external device can include the external device 220, the sensors 225 of the external device 220, the HMD 310, the mobile handset 410, the external camera 610, the external HMD 710, the display 810, the one or more servers 847, a computing system 1000, or a combination thereof.

At operation 915, the process 900 includes detecting a condition based on the image, the data stream, an operational status of the apparatus, or any combination thereof. In some cases, detecting the condition based on the image includes determining that the object is missing from a portion of the environment in the image. In one example, determining that the object is missing from the portion of the environment in the image includes determining that at least a part of the object is occluded in the image (e.g., as shown in FIG. 6B). In some cases, detecting the condition based on the operational status of the device includes determining that an availability of a resource is below a threshold. In one example, determining that the availability of the resource is below the threshold includes determining that a battery level of a battery is below a battery level threshold. In another example, determining that the availability of the resource is below the threshold includes determining that an available bandwidth is below a bandwidth threshold. In some cases, detecting the condition based on the operational status of the device includes receiving user input corresponding to offloading processing to the external device. For example, as described above, a user can provide user input (e.g., a gesture input, pressing a virtual or physical button, etc.) to control whether the HMD 310 or an external device performs a particular function.

In some examples, detecting the condition based on the image includes determining one or more lighting conditions in the image (e.g., a low-light condition). In some cases, determining the one or more lighting conditions in the image can include determining that one or more light values of the image are below a lighting threshold (e.g., a lighting threshold of 3 lux).

In some examples, the object is a display of an external display device. In some cases, the process 900 includes detecting the condition based on the image at least in part by identifying, in the image, visual media content displayed on the display of the external display device.

At operation 920, the process 900 includes determining, in response to detecting the condition, a location of the object in the environment based on at least one of the image and the data stream. In some cases, the external device includes a second image sensor. In some cases, the data stream includes a second image of a second portion of the environment, and determining the location of the object in the environment is based at least in part on a depiction of the object in the second image. In some examples, the portion of the environment in the image and the second portion of the environment overlap.

In some examples, determining the location of the object in the environment includes sending a request for the external device to identify the location of the object in the environment. In some examples, the process 900 can include receiving a response from the external device identifying the location of the object in the environment.

In some examples, in response to detecting the condition, the process 900 can include generating a merged dataset at least by combining data from the data stream with the image captured by the image sensor. In such examples, determining the location of the object can be based at least in part on the merged dataset.

At operation 925, the process 900 includes generating an output based on the location of the object in the environment. In some examples, generating the output includes generating content. In some cases, the process 900 includes outputting the content based on the location of the object in the environment. For instance, outputting the content includes can include transmitting or sending the content to a display of the device to be displayed. In some examples, the content virtually extends the display of the external display device. In some cases, process 900 can include sending the content to an audio output device to be played.

In some examples, generating the output includes controlling the device based on a user input. For instance, the HMD 310 can receive a user input to control the device or the HMD 310 (e.g., a user input requesting to turn an external device such as a light on or off through a home automation application running on the imaging device, a user input requesting the HMD 310 turn off, etc.).

In some examples, generating the output includes generating content at least in part by overlaying virtual content over a region of the image. In such examples, the region of the image is based on the location of the object in the environment. In cases where the object is a display of the external display device, the region of the image is adjacent to a depiction of the display of the external display device in the image. In some examples, the object is a hand of a user of the device, where the hand is at least partially adjacent to the region of the image.

In some examples, the process 900 can include detecting an additional condition based on at least one of an additional image captured by the image sensor, the data stream, and the operational status of the device. In response to detecting the additional condition, the process 900 can include performing a function previously performed by the external device. For instance, the HMD 310 described above can detect an additional condition that can trigger that HMD 310 to perform a function or resume performance of a function that was previously offloaded to an external device (e.g., hand tracking, head tracking, body tracking, etc.).

In some examples, the processes described herein (e.g., process 900 and/or other process described herein) may be performed by a computing device or apparatus. In one example, the process 900 can be performed by the XR system 210 of FIG. 2. In another example, the process 900 can be performed by a computing device with the computing system 1000 shown in FIG. 10. For instance, a computing device with the computing system 1000 shown in FIG. 10 can include the components of the image processing engine 205 of the XR system 210 and can implement the operations of FIG. 10.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 900. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 900 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
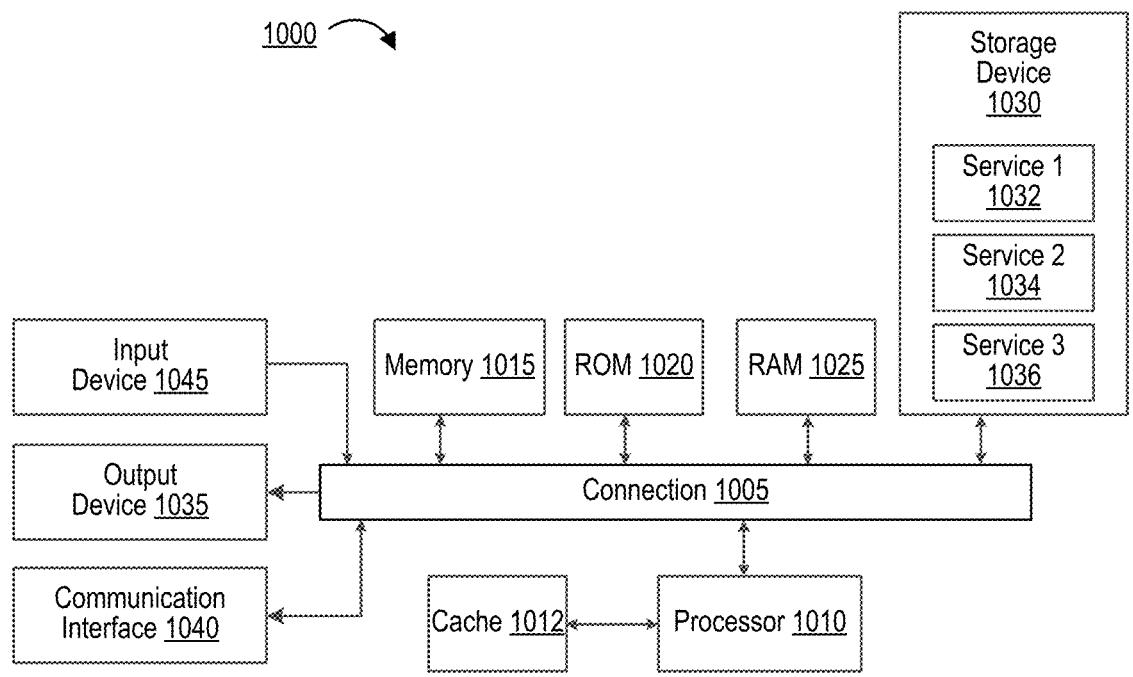
FIG. 10 is a diagram illustrating an example of a computing system for implementing certain aspects described herein.

FIG. 10 is a diagram illustrating an example of a system for implementing certain aspects of the present technology. In particular, FIG. 10 illustrates an example of computing system 1000, which can be for example any computing device making up internal computing system, a remote computing system, a camera, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for processing image data, the apparatus comprising at least one memory and one or more processors coupled to the memory. The one or more processors are configured to: receive an image of a portion of an environment captured by an image sensor, wherein the environment includes an object; identify a data stream from an external device; detect a condition based on at least one of the image, the data stream, and an operational status of the apparatus; in response to detecting the condition, determine a location of the object in the environment based on at least one of the image and the data stream; and generate an output based on the location of the object in the environment.

Aspect 2: The apparatus of Aspect 1, wherein, to detect the condition based on the image, the one or more processors are configured to determine that the object is missing from a portion of the environment in the image.

Aspect 3: The apparatus of Aspect 2, wherein, to determine that the object is missing from the portion of the environment in the image, the one or more processors are configured to determine that at least a part of the object is occluded in the image.

Aspect 4: The apparatus of any of Aspects 2 or 3, wherein the external device includes a second image sensor, wherein the data stream includes a second image of a second portion of the environment, and wherein determining the location of the object in the environment is based at least in part on a depiction of the object in the second image.

Aspect 5: The apparatus of Aspect 4, wherein the portion of the environment and the second portion of the environment overlap.

Aspect 6: The apparatus of any of Aspects 1 to 5, wherein, to detect the condition based on the operational status of the apparatus, the one or more processors are configured to determine that an availability of a resource is below a threshold.

Aspect 7: The apparatus of Aspect 6, wherein, to determine that the availability of the resource is below the threshold, the one or more processors are configured to determine that a battery level of a battery is below a battery level threshold.

Aspect 8: The apparatus of any of Aspects 6 or 7, wherein, to determine that the availability of the resource is below the threshold, the one or more processors are configured to determine that an available bandwidth is below a bandwidth threshold.

Aspect 9: The apparatus of any of Aspects 1 to 8, wherein, to detect the condition based on the operational status of the apparatus, the one or more processors are configured to receive user input corresponding to offloading processing to the external device.

Aspect 10: The apparatus of any of Aspects 1 to 9, wherein, to generate the output, the one or more processors are configured to generate content.

Aspect 11: The apparatus of Aspect 10, wherein the one or more processors are configured to: output the content based on the location of the object in the environment.

Aspect 12: The apparatus of Aspect 11, further comprising: a display; wherein, to output the content, the one or more processors are configured to send the content to the display to be displayed.

Aspect 13: The apparatus of any of Aspects 1 to 12, wherein the one or more processors are configured to: detect an additional condition based on at least one of an additional image captured by the image sensor, the data stream, and the operational status of the apparatus; and in response to detecting the additional condition, perform a function previously performed by the external device.

Aspect 14: The apparatus of any of Aspects 1 to 13, wherein, to generate the output, the one or more processors are configured to: control the apparatus based on a user input.

Aspect 15: The apparatus of any of Aspects 1 to 14, wherein, to detect the condition based on the image, the one or more processors are configured to determine one or more lighting conditions in the image.

Aspect 16: The apparatus of Aspect 15, wherein, to determine the one or more lighting conditions in the image, the one or more processors are configured to determine that one or more light values of the image are below a lighting threshold.

Aspect 17: The apparatus of any of Aspects 1 to 16, wherein, to determine the location of the object in the environment, the one or more processors are configured to: send a request for the external device to identify the location of the object in the environment; and receive a response from the external device identifying the location of the object in the environment.

Aspect 18: The apparatus of any of Aspects 1 to 17, wherein the object is a display of an external display device.

Aspect 19: The apparatus of Aspect 18, wherein, to detect the condition based on the image, the one or more processors are configured to identify, in the image, visual media content displayed on the display of the external display device.

Aspect 20: The apparatus of any of Aspects 18 or 19, wherein, to generate the output, the one or more processors are configured to generate content, and wherein the content virtually extends the display of the external display device.

Aspect 21: The apparatus of any of Aspects 1 to 20, wherein, to generate the output, the one or more processors are configured to: generate content at least in part by overlaying virtual content over a region of the image, wherein the region of the image is based on the location of the object in the environment.

Aspect 22: The apparatus of Aspect 21, wherein the object is a display of an external display device, and wherein the region of the image is adjacent to a depiction of the display of the external display device in the image.

Aspect 23: The apparatus of Aspect 21, wherein the object is a hand of a user of the apparatus, and wherein the hand is at least partially adjacent to the region of the image.

Aspect 24: The apparatus of any of Aspects 1 to 21, wherein the object is visual content displayed on the display.

Aspect 25: The apparatus of any of Aspects 1 to 21, wherein the object is a head of a user of the apparatus.

Aspect 26: The apparatus of any of Aspects 1 to 21, wherein the object is a body of a user of the apparatus.

Aspect 27: The apparatus of any of Aspects 1 to 26, wherein the one or more processors are further configured to: in response to detecting the condition, generate a merged dataset at least by combining data from the data stream with the image captured by the image sensor, wherein determining the location of the object is based at least in part on the merged dataset.

Aspect 28: The apparatus of any of Aspects 1 to 27, wherein the apparatus is a head-mounted display (HMD).

Aspect 29: The apparatus of any of Aspects 1 to 28, further comprising: an audio output device; wherein, to generate the output, the one or more processors are configured to generate content; and wherein the one or more processors are configured to send the content to the audio output device to be played.

Aspect 30: A method for processing image data, comprising: receiving an image of a portion of an environment captured by an image sensor, wherein the environment includes an object; identifying, by a device, a data stream from an external device; detecting a condition based on at least one of the image, the data stream, and an operational status of the device; in response to detecting the condition, determining a location of the object in the environment based on at least one of the image and the data stream; and generating an output based on the location of the object in the environment.

Aspect 31: The method of Aspect 30, wherein detecting the condition based on the image includes determining that the object is missing from a portion of the environment in the image.

Aspect 32: The method of Aspect 31, wherein determining that the object is missing from the portion of the environment in the image includes determining that at least a part of the object is occluded in the image.

Aspect 33: The method of any of Aspects 31 or 32, wherein the external device includes a second image sensor, wherein the data stream includes a second image of a second portion of the environment, and wherein determining the location of the object in the environment is based at least in part on a depiction of the object in the second image.

Aspect 34: The method of Aspect 33, wherein the portion of the environment and the second portion of the environment overlap.

Aspect 35: The method of any of Aspects 30 to 34, wherein detecting the condition based on the operational status of the device includes determining that an availability of a resource is below a threshold.

Aspect 36: The method of Aspect 35, wherein determining that the availability of the resource is below the threshold includes determining that a battery level of a battery is below a battery level threshold.

Aspect 37: The method of any of Aspects 35 or 36, wherein determining that the availability of the resource is below the threshold includes determining that an available bandwidth is below a bandwidth threshold.

Aspect 38: The method of any of Aspects 30 to 37, wherein detecting the condition based on the operational status of the device includes receiving user input corresponding to offloading processing to the external device.

Aspect 39: The method of any of Aspects 30 to 38, wherein generating the output includes generating content.

Aspect 40: The method of Aspect 39, further comprising outputting the content based on the location of the object in the environment.

Aspect 41: The method of Aspect 40, wherein outputting the content includes sending the content to a display of the device to be displayed.

Aspect 42: The method of any of Aspects 30 to 41, further comprising: detecting an additional condition based on at least one of an additional image captured by the image sensor, the data stream, and the operational status of the device; and in response to detecting the additional condition, performing a function previously performed by the external device.

Aspect 43: The method of any of Aspects 30 to 42, wherein generating the output includes controlling the device based on a user input.

Aspect 44: The method of any of Aspects 30 to 43, wherein detecting the condition based on the image includes determining one or more lighting conditions in the image.

Aspect 45: The method of Aspect 44, wherein determining the one or more lighting conditions in the image includes determining that one or more light values of the image are below a lighting threshold.

Aspect 46: The method of any of Aspects 30 to 45, wherein determining the location of the object in the environment includes: sending a request for the external device to identify the location of the object in the environment; and receiving a response from the external device identifying the location of the object in the environment.

Aspect 47: The method of any of Aspects 30 to 46, wherein the object is a display of an external display device.

Aspect 48: The method of Aspect 47, wherein detecting the condition based on the image includes identifying, in the image, visual media content displayed on the display of the external display device.

Aspect 49: The method of any of Aspects 47 or 48, wherein generating the output includes generating content, and wherein the content virtually extends the display of the external display device.

Aspect 50: The method of any of Aspects 30 to 49, wherein generating the output includes: generating content at least in part by overlaying virtual content over a region of the image, wherein the region of the image is based on the location of the object in the environment.

Aspect 51: The method of Aspect 50, wherein the object is a display of an external display device, and wherein the region of the image is adjacent to a depiction of the display of the external display device in the image.

Aspect 52: The method of Aspect 50, wherein the object is a hand of a user of the device, and wherein the hand is at least partially adjacent to the region of the image.

Aspect 53: The method of any of Aspects 30 to 50, wherein the object is visual content displayed on the display.

Aspect 54: The method of any of Aspects 30 to 50, wherein the object is a head of a user of the apparatus.

Aspect 55: The method of any of Aspects 30 to 50, wherein the object is a body of a user of the apparatus.

Aspect 56: The method of any of Aspects 30 to 55, further comprising: in response to detecting the condition, generating a merged dataset at least by combining data from the data stream with the image captured by the image sensor, wherein determining the location of the object is based at least in part on the merged dataset.

Aspect 57: The method of any of Aspects 30 to 56, wherein generating the output includes generating content, and further comprising sending the content to an audio output device to be played.

Aspect 58: A computer-readable storage medium storing instructions that, when executed by one or more processors, cause the one or more processors to perform operations according to any of Aspects 1 to 57.

Aspect 59: An apparatus comprising means for performing operations according to any of Aspects 1 to 57.

Aspect 60: An apparatus for processing image data, the apparatus comprising at least one memory and one or more processors coupled to the memory. The one or more processors are configured to: receive an image of a portion of an environment captured by an image sensor, wherein the environment includes an object; detect a condition regarding an availability of a resource; in response to detecting the condition, determine a location of at least a part of the object in the environment based on at least a data stream from a device; and output content that is based on the location of at least the part of the object in the environment.

Aspect 61: The apparatus of Aspect 60, wherein, to detect the condition, the one or more processors are configured to determine that the availability of the resource is below a threshold.

Aspect 62: The apparatus of Aspect 61, wherein, to determine that the availability of the resource is below the threshold, the one or more processors are configured to determine that a battery level of a battery is below a battery level threshold.

Aspect 63: The apparatus of any of Aspects 61 or 62, wherein, to determine that the availability of the resource is below the threshold, the one or more processors are configured to determine that an available bandwidth is below a bandwidth threshold.

Aspect 64: The apparatus of any of Aspects 60 to 63, wherein, to determine the location of at least the part of the object in the environment, the one or more processors are configured to: send a request for the device to identify the location of at least the part of the object in the environment; and receive a response from the device identifying the location of at least the part of the object in the environment.

Aspect 65: The apparatus of any of Aspects 60 to 64, wherein the one or more processors are further configured to: generate the content at least in part by overlaying virtual content over a region of the image, wherein the region of the image is based on the location of at least the part of the object in the environment.

Aspect 66: The apparatus of Aspect 65, wherein the object is a hand of a user of the apparatus, and wherein the hand at least partially adjacent to the region of the image.

Aspect 67: The apparatus of any of Aspects 60 to 66, wherein the one or more processors are further configured to: in response to detecting the condition, generate a merged dataset at least by merging data from the data stream with the image captured by the image sensor, wherein determining the location of at least the part of the object is based on the merged dataset.

Aspect 68: The apparatus of any of Aspects 60 to 67, wherein the apparatus is a head-mounted display (HMD).

Aspect 69: The apparatus of any of Aspects 60 to 68, further comprising: a display, wherein, to output the content, the one or more processors are configured to send the content to the display to be displayed by the display.

Aspect 70: The apparatus of any of Aspects 60 to 69, further comprising: an audio output device, wherein, to output the content, the one or more processors are configured to send the content to the audio output device to be played by the audio output device.

Aspect 71: A method of processing image data, comprising operations according to any of Aspects 60 to 70.

Aspect 72: A computer-readable storage medium storing instructions that, when executed by one or more processors, cause the one or more processors to perform operations according to any of Aspects 60 to 70.

Aspect 73: An apparatus comprising means for performing operations according to any of Aspects 60 to 70.

Aspect 74: An apparatus for processing image data, the apparatus comprising at least one memory and one or more processors coupled to the memory. The one or more processors are configured to: receive an image of a portion of an environment captured by an image sensor, wherein the environment includes an object; detect a condition based on the image; in response to detecting the condition, generate content based on at least a data stream from a device; and output the content based on a location of at least a part the object in the environment.

Aspect 75: The apparatus of Aspect 74, wherein, to detect the condition, the one or more processors are configured to determine that the object is missing from a portion of the environment in the image.

Aspect 76: The apparatus of Aspect 74, wherein the object is a display of an external device.

Aspect 77: The apparatus Aspect 76, wherein, to detect the condition, the one or more processors are configured to identify, in the image, a depiction of visual media content displayed on the display of the external device.

Aspect 78: The apparatus of Aspect 76, wherein, to detect the condition, the one or more processors are configured to detect a presence of the display in the proximity of the apparatus.

Aspect 79: The apparatus of Aspect 76, wherein, the one or more processors are further configured to generate a direction indicator pointing toward the position of the display.

Aspect 80: The apparatus of any of Aspects 76 to 79, wherein the content virtually extends the display of the external device.

Aspect 81: The apparatus of any of Aspects 74 to 80, wherein the one or more processors are configured to: generate the content at least in part by overlaying virtual content over a region of the image, wherein the region of the image is based on the location of at least the part of the object in the environment.

Aspect 82: The apparatus of Aspect 81, wherein the object is a display of an external device, and wherein the region of the image is adjacent to a depiction of the display of the external device in the image.

Aspect 83: The apparatus of any of Aspects 74 to 82, wherein the one or more processors are configured to: in response to detecting the condition, generate a merged dataset at least by merging data from the data stream with the image captured by the image sensor, wherein the content is generated based on the merged dataset.

Aspect 84: The apparatus of any of Aspects 74 to 83, wherein the apparatus is a head-mounted display (HMD).

Aspect 85: The apparatus of any of Aspects 74 to 84, further comprising: a display, wherein, to output the content, the one or more processors are configured to send the content to the display to be displayed by the display.

Aspect 86: The apparatus of any of Aspects 74 to 85, further comprising: an audio output device, wherein, to output the content, the one or more processors are configured to send the content to the audio output device to be played by the audio output device.

Aspect 87: A method of processing image data, comprising operations according to any of Aspects 74 to 86.

Aspect 88: A computer-readable storage medium storing instructions that, when executed by one or more processors, cause the one or more processors to perform operations according to any of Aspects 74 to 86.

Aspect 89: An apparatus comprising means for performing operations according to any of Aspects 74 to 86.

What is claimed is:

1. An apparatus for imaging, the apparatus comprising:
at least one memory; and
at least one processor coupled to the at least one memory, the at least one processor configured to:
determine, based on image data captured using an image sensor, a first pose of a display device relative to a field of view of the image sensor at a first point in time;
receive additional content to render for an extended reality (XR) display at a second pose relative to the field of view, the second pose having a predetermined relative position relative to the first pose of the display device, wherein the additional content is associated with content displayed on the display device;
render the additional content at the second pose at the first point in time;
determine a third pose of the additional content relative to the field of view at a second point in time, the third pose having the predetermined relative position relative to a fourth pose of the display device at the second point in time; and
render the additional content at the third pose at the second point in time.

2. The apparatus of claim 1, wherein the at least one processor is configured to:
initiate hand tracking, wherein the hand tracking is based on further image data captured using the image sensor.

3. The apparatus of claim 1, wherein the at least one processor is configured to:
initiate hand tracking, wherein the hand tracking is based on further image data captured using a second image sensor of the display device.

4. The apparatus of claim 1, wherein the at least one processor is configured to:
output a signal to the display device requesting that the display device perform hand tracking; and
receive hand tracking data from the display device, wherein the hand tracking data is based on the hand tracking as performed by the display device, wherein the hand tracking is based on further image data captured using a second image sensor of the display device.

5. The apparatus of claim 1, wherein the content displayed on the display device includes a first portion of a scene, wherein the additional content includes a second portion of the scene that extends from the first portion of the scene in a direction, wherein the second pose of the additional content is adjacent to the first pose of the display device in the image data in the direction according to the predetermined relative position, and wherein the third pose of the additional content is adjacent to the fourth pose of the display device in the image data in the direction according to the predetermined relative position.

6. The apparatus of claim 1, wherein the second pose of the additional content is configured to overlap with at least a portion of the first pose of the display device according to the predetermined relative position, and wherein the third pose of the additional content is configured to overlap with at least a portion of the fourth pose of the display device according to the predetermined relative position.

7. The apparatus of claim 1, wherein the additional content includes information about the content displayed on the display device.

8. The apparatus of claim 1, wherein the additional content identifies at least one object represented in the content displayed on the display device.

9. The apparatus of claim 1, wherein the second pose of the additional content is a distance away from the first pose of the display device in a direction according to the predetermined relative position, and wherein the third pose of the additional content is the distance away from the fourth pose of the display device in the direction according to the predetermined relative position.

10. The apparatus of claim 1, wherein the at least one processor is configured to:
render, for the XR display, a representation of the content that is displayed on the display device.

11. The apparatus of claim 1, wherein the at least one processor is configured to:
receive a first indication to render the additional content;
initiate hand tracking in response to receiving the first indication;
receive a second indication that rendering of the additional content on the XR display is to terminate; and
terminate the hand tracking in response to receiving the second indication.

12. The apparatus of claim 1, wherein the at least one processor is configured to:
receive a first indication to render the additional content;
initiate hand tracking in response to receiving the first indication;
receive a second indication that the display device is to stop displaying the content; and
terminate the hand tracking in response to receiving the second indication.

13. The apparatus of claim 1, further comprising:
the XR display.

14. The apparatus of claim 1, further comprising:
the image sensor.

15. The apparatus of claim 1, wherein the apparatus includes at least one of a head-mounted display (HMD), a mobile handset, or a wireless communication device.

16. A method for imaging, the method comprising:
determining, based on image data captured using an image sensor, a first pose of a display device relative to a field of view of the image sensor at a first point in time period;
receiving additional content to render for an extended reality (XR) display at a second pose relative to the field of view, the second pose having a predetermined relative position relative to the first pose of the display device, wherein the additional content is associated with content displayed on the display device;
rendering the additional content at the second pose at the first point in time;
determining a third pose of the additional content relative to the field of view at a second point in time, the third pose having the predetermined relative position relative to a fourth pose of the display device at the second point in time; and
rendering the additional content at the third pose at the second point in time.

17. The method of claim 16, further comprising:
initiating hand tracking, wherein the hand tracking is based on further image data captured using the image sensor.

18. The method of claim 16, further comprising:
initiating hand tracking, wherein the hand tracking is based on further image data captured using a second image sensor of the display device.

19. The method of claim 16, further comprising:
outputting a signal to the display device requesting that the display device perform hand tracking; and
receiving hand tracking data from the display device, wherein the hand tracking data is based on the hand tracking as performed by the display device, wherein the hand tracking is based on further image data captured using a second image sensor of the display device.

20. The method of claim 16, wherein the content displayed on the display device includes a first portion of a scene, wherein the additional content includes a second portion of the scene that extends from the first portion of the scene in a direction, wherein the second pose of the additional content is adjacent to the first pose of the display device in the image data in the direction according to the predetermined relative position, and wherein the third pose of the additional content is adjacent to the fourth pose of the display device in the image data in the direction according to the predetermined relative position.

21. The method of claim 16, wherein the second pose of the additional content is configured to overlap with at least a portion of the first pose of the display device according to the predetermined relative position, and wherein the third pose of the additional content is configured to overlap with at least a portion of the fourth pose of the display device according to the predetermined relative position.

22. The method of claim 16, wherein the additional content includes information about the content displayed display of the device.

23. The method of claim 16, wherein the additional content identifies at least one object represented in the content displayed on the display device.

24. The method of claim 16, wherein the second pose of the additional content is a distance away from the first pose of the display device in a direction according to the predetermined relative position, and wherein the third pose of the additional content is the distance away from the fourth pose of the display device in the direction according to the predetermined relative position.

25. The method of claim 16, further comprising:
receiving a first indication to render the additional content;
initiating hand tracking in response to receiving the first indication;
receiving a second indication that rendering of the additional content on the XR display is to terminate; and
terminating the hand tracking in response to receiving the second indication.

26. The method of claim 16, further comprising:
receiving a first indication to render the additional content;
initiating hand tracking in response to receiving the first indication;
receiving a second indication that the display device is to stop displaying the content; and
terminating the hand tracking in response to receiving the second indication.

27. The method of claim 16, wherein a head-mounted display device includes the XR display.

28. The method of claim 16, wherein a mobile handset includes the XR display.

29. The method of claim 16, wherein a head-mounted display device includes the image sensor.

30. The method of claim 16, wherein a mobile handset includes the image sensor.

* * * * *